(12) United States Patent
Fukushima

(10) Patent No.: US 8,496,302 B2
(45) Date of Patent: Jul. 30, 2013

(54) BRAKE BOOSTER

(75) Inventor: Toshiaki Fukushima, Saitama (JP)

(73) Assignee: Robert Bosch GmbH, Stuttgart (DE)

( * ) Notice: Subject to any disclaimer, the term of this patent is extended or adjusted under 35 U.S.C. 154(b) by 73 days.

(21) Appl. No.: 13/241,405

(22) Filed: Sep. 23, 2011

(65) Prior Publication Data
US 2013/0076114 A1 Mar. 28, 2013

(51) Int. Cl.
B60T 8/44 (2006.01)

(52) U.S. Cl.
USPC ..................... 303/114.1; 303/115.2

(58) Field of Classification Search
USPC ............... 60/545; 92/136; 188/156, 157, 345, 188/355; 303/3, 10, 11, 15, 114.1, 114.2, 303/115.2, 115.4
See application file for complete search history.

(56) References Cited

U.S. PATENT DOCUMENTS

| 4,938,543 A | 7/1990 | Parker et al. |
| 5,112,116 A | 5/1992 | Mikhaeil-Boules et al. |
| 5,207,488 A | 5/1993 | Newton et al. |
| 5,246,283 A | 9/1993 | Shaw et al. |
| 5,499,865 A | 3/1996 | Katagiri et al. |
| 5,667,284 A | 9/1997 | Drennen et al. |
| 5,758,930 A * | 6/1998 | Schiel et al. ............... 303/113.4 |
| 5,857,334 A | 1/1999 | Sekiguchi |
| 5,927,825 A | 7/1999 | Schenk et al. |
| 6,033,036 A * | 3/2000 | Ruffer et al. ............... 303/114.1 |
| 6,357,835 B1* | 3/2002 | Boisseau ..................... 303/113.5 |
| 6,758,041 B2 | 7/2004 | Bishop et al. |
| 2002/0084693 A1* | 7/2002 | Isono et al. ................. 303/113.1 |
| 2002/0180261 A1* | 12/2002 | Chang ......................... 303/113.1 |
| 2003/0061933 A1* | 4/2003 | Hageman et al. ............... 92/136 |
| 2008/0169702 A1* | 7/2008 | Ohnishi ..................... 303/119.1 |
| 2010/0000830 A1* | 1/2010 | Budde et al. ............ 188/218 XL |
| 2011/0178687 A1 | 7/2011 | Anderson et al. |
| 2013/0076115 A1* | 3/2013 | Fukushima ................. 303/6.01 |

* cited by examiner

Primary Examiner — Bradley King
Assistant Examiner — Nicholas J Lane
(74) Attorney, Agent, or Firm — Michael Best & Friedrich LLP

(57) ABSTRACT

A brake booster for use in a hydraulic braking system having a brake pedal, a master cylinder, and a hydraulic control unit includes a housing, a screw drive arrangement positioned at least partially in the housing, a motor coupled to the housing for actuating the screw drive arrangement, and a piston assembly positioned in the housing. The piston assembly and the housing together at least partially define a first fluid chamber having an opening for providing fluid communication with the master cylinder, and a second fluid chamber having an opening for providing fluid communication with the hydraulic control unit. The screw drive arrangement is operable to move a piston of the piston assembly for varying the volume of the second fluid chamber, and movement of the piston does not vary the volume of the first fluid chamber.

27 Claims, 19 Drawing Sheets

BRAKE BOOSTER

BACKGROUND

The present invention relates to braking systems, and particularly, to a booster arrangement for a braking system.

SUMMARY

In one embodiment, the invention provides a brake booster for use in a hydraulic braking system having a brake pedal, a master cylinder, and a hydraulic control unit. The brake booster includes a housing, a screw drive arrangement positioned at least partially in the housing, a motor coupled to the housing for actuating the screw drive arrangement, and a piston assembly positioned in the housing. The piston assembly and the housing together at least partially define a first fluid chamber having an opening for providing fluid communication with the master cylinder, and a second fluid chamber having an opening for providing fluid communication with the hydraulic control unit. The screw drive arrangement is operable to move a piston of the piston assembly for varying the volume of the second fluid chamber, and movement of the piston does not vary the volume of the first fluid chamber.

In another embodiment the invention provides a hydraulic braking system including a brake pedal, a master cylinder coupled with the brake pedal, a hydraulic control unit coupled with a plurality of wheel brakes, and a brake booster coupled between the master cylinder and the hydraulic control unit. The brake booster includes a housing, a screw drive arrangement positioned at least partially in the housing, a motor coupled to the housing for actuating the screw drive arrangement, and a piston assembly positioned in the housing. The piston assembly and the housing together at least partially define a first fluid chamber having an opening for providing fluid communication with the master cylinder, and a second fluid chamber having an opening for providing fluid communication with the hydraulic control unit. The screw drive arrangement is operable to move a piston of the piston assembly for varying the volume of the second fluid chamber, and movement of the piston does not vary the volume of the first fluid chamber.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
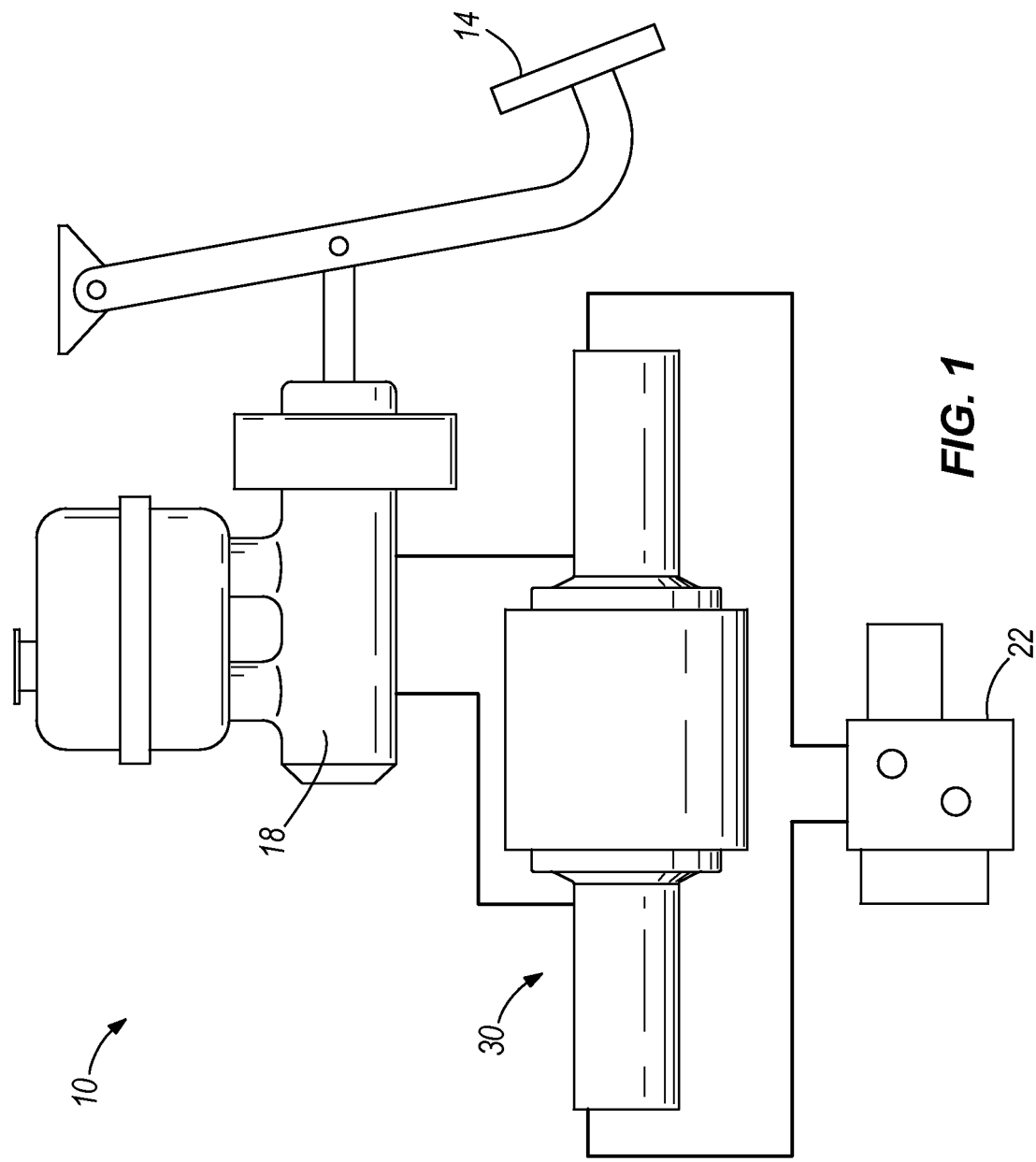
FIG. 1 is a schematic view of a portion of a hydraulic braking system according to the present invention.

FIG. 1 schematically illustrates a hydraulic braking system 10 for use with vehicle or other applications. The braking system 10 includes a brake pedal 14 configured for manual actuation by a user (e.g., a driver of a vehicle). The brake pedal 14 is coupled to a master cylinder 18, and in the illustrated embodiment, no vacuum booster is provided between the brake pedal 14 and the master cylinder 18. The hydraulic braking system 10 further includes a hydraulic control unit 22 operable to control the flow of hydraulic braking fluid to one or more wheel brakes 26 (schematically illustrated in FIGS. 9-12). As shown in FIGS. 2-12, an optional pedal feel simulator 28 can be coupled with the master cylinder 18, as is known in the art.

The hydraulic braking system 10 further includes a brake booster 30 fluidly coupled between the master cylinder 18 and the hydraulic control unit 22. The booster 30 can be positioned essentially anywhere between the master cylinder 18 and the hydraulic control unit 22, adding flexibility to the design of the system 10. The brake booster 30 is operable to selectively increase or boost the fluid pressure created at the master cylinder 18 in response to the user depressing the brake pedal 14, and replaces conventional vacuum boosters, as will be discussed in further detail below.

FIGS. 2-12 illustrate a first embodiment of the brake booster 30 according to the present invention. The brake booster 30 includes a housing 34 that supports a screw drive arrangement 38. A motor 40 is also coupled to the housing 34 and integrated with the screw drive arrangement 38 for actuating the screw drive arrangement 38. The motor 40 includes a stator 44 and a rotor 48. The illustrated rotor 48 includes a permanent magnet 52 and a mounting portion 56. The rotor 48 is rotatably supported by angular bearings 60 that permit limited translation of the rotor 48 along a longitudinal axis 64 of the screw drive arrangement 38.

The illustrated screw drive arrangement 38 is symmetrically configured to simultaneously provide two separate, mirror-image drive arrangements, each being coaxial with the longitudinal axis 64. As will be discussed further below, this enables the single booster 30 to operate for all four wheel brakes 26 with two separate inputs and outputs. However, in other embodiments, the booster 30 need not have this dual, symmetrical arrangement, but instead can take the form of two completely separate boosters, each operating in a manner similar to one half (e.g., the left side or the right side) of the illustrated booster 30.

Figure 3:
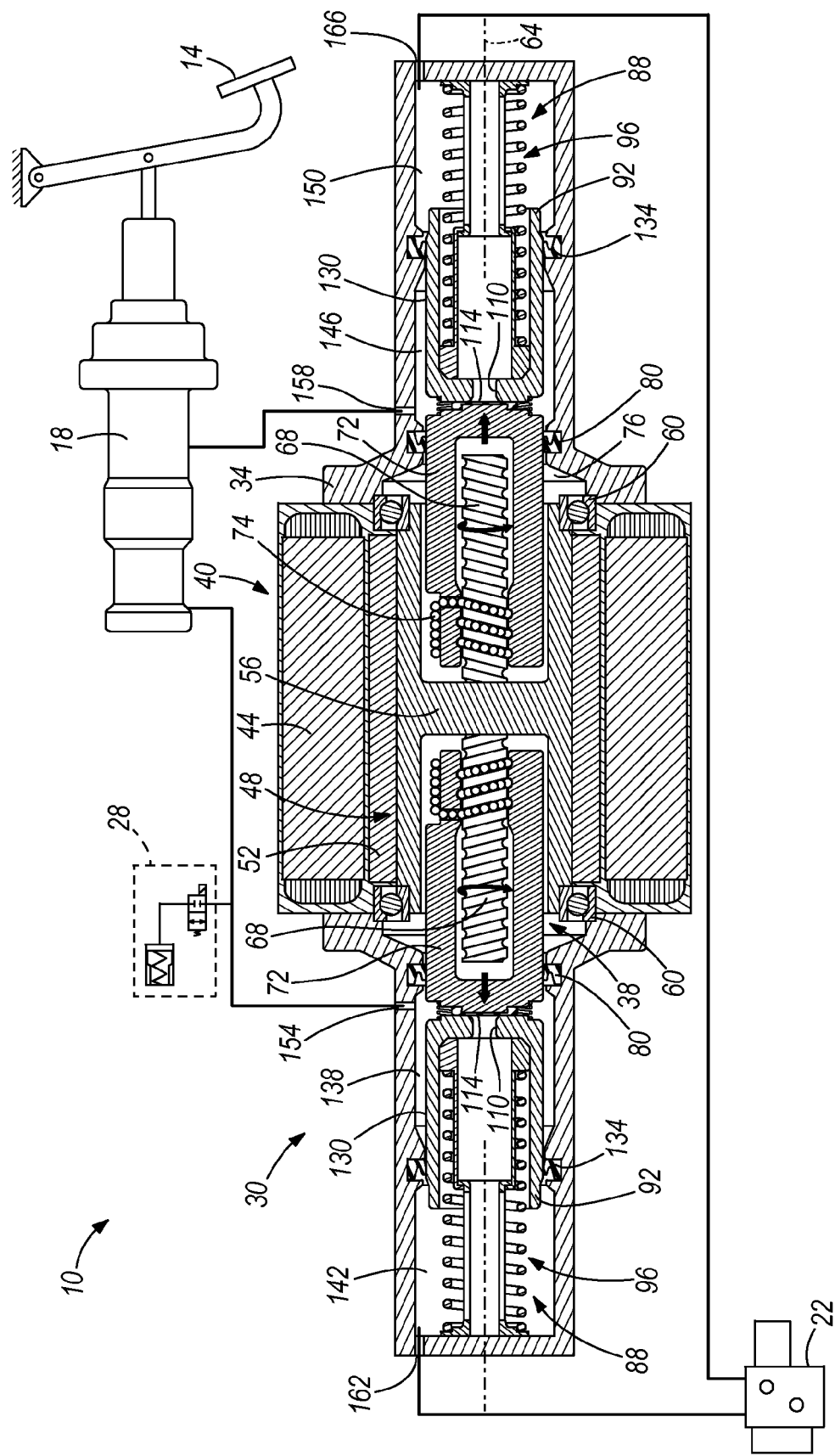
FIG. 3 is a section and partially schematic view of the brake booster of FIG. 2, shown in a stand-by position.
Figure 4:
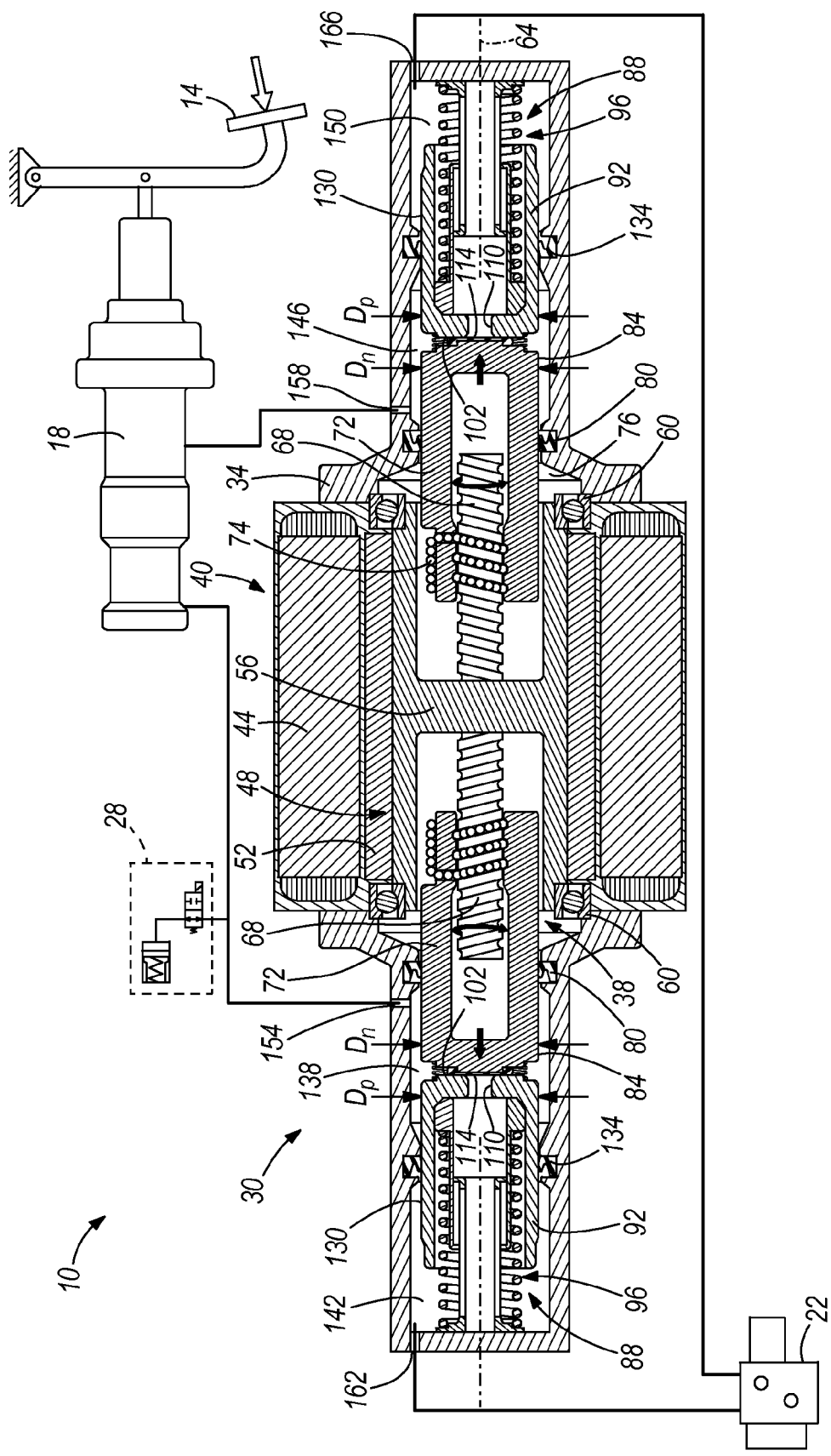
FIG. 4 is a section and partially schematic view of the brake booster of FIG. 2, shown in a user-actuated braking position.
Figure 5:
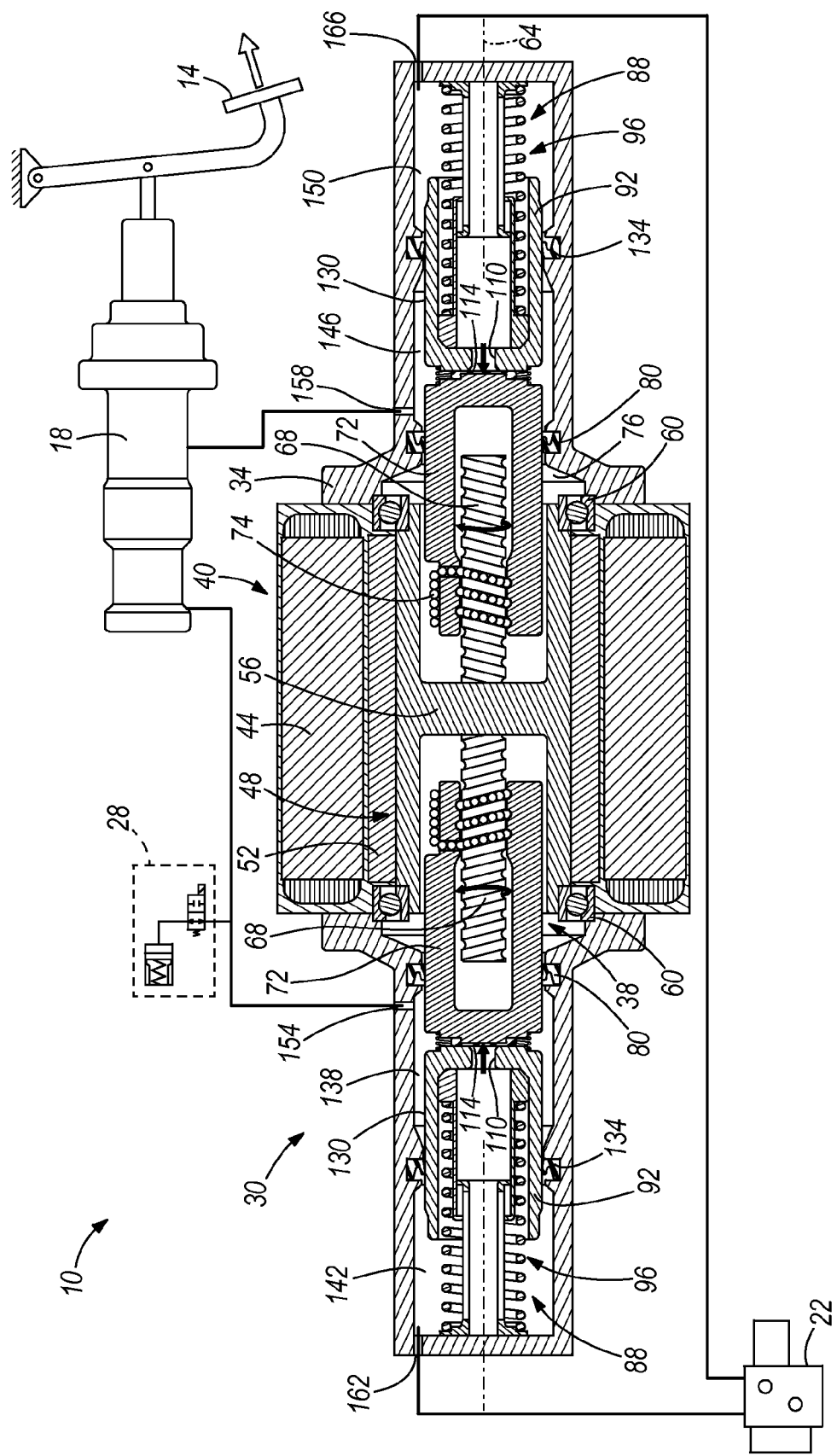
FIG. 5 is a section and partially schematic view of the brake booster of FIG. 2, shown in a returning position after a user has stopped actuating braking

Each drive arrangement includes a screw 68 coupled to the rotor 48 for rotation with the rotor 48, and a nut 72 positioned over the screw 68 such that rotation of the screw 68 in a first direction causes movement (e.g., translation) of the nut 72 in a first direction. With reference to FIGS. 3 and 4, rotation of the rotor 48 in a first direction causes the two screws 68 to rotate, thereby causing the nut 72 on the left side to translate to the left and the nut 72 on the right side to translate to the right. Likewise, as shown in FIG. 5, rotation of the rotor 48 in a second direction opposite the first direction causes the two screws 68 to rotate in the opposite manner, thereby causing the nut 72 on the left side to translate to the right and the nut 72 on the right side to translate to the left. The illustrated screw drive arrangement 38 is a ball screw drive, further including a plurality of balls 74 positioned between each screw 68 and nut 72 (e.g., in respective grooves or threads as is conventionally understood).

The housing 34 is generally co-axial with the longitudinal axis 64 of the screw drive arrangement 38 and defines a screw drive chamber 76 between two seals 80. Referring to FIG. 4, each of the two seals 80 sealing engages an outer surface 84 of a respective nut 72. The illustrated nuts 72 have a generally cylindrical outer surface 84 with a substantially constant outer surface dimension $D_n$ (e.g., a substantially constant outer diameter). In other embodiments, the nuts 72 can be configured to have other geometries (e.g., oval, square, etc.) for the outer surface, resulting in corresponding outer surface dimensions $D_n$. As the screw drive arrangement 38 drives the nuts 72 during operation, the respective outer surfaces 84 slide relative to the seals 80, thereby moving the nuts 72 further out of or into the central screw drive chamber 76.

Figure 2:
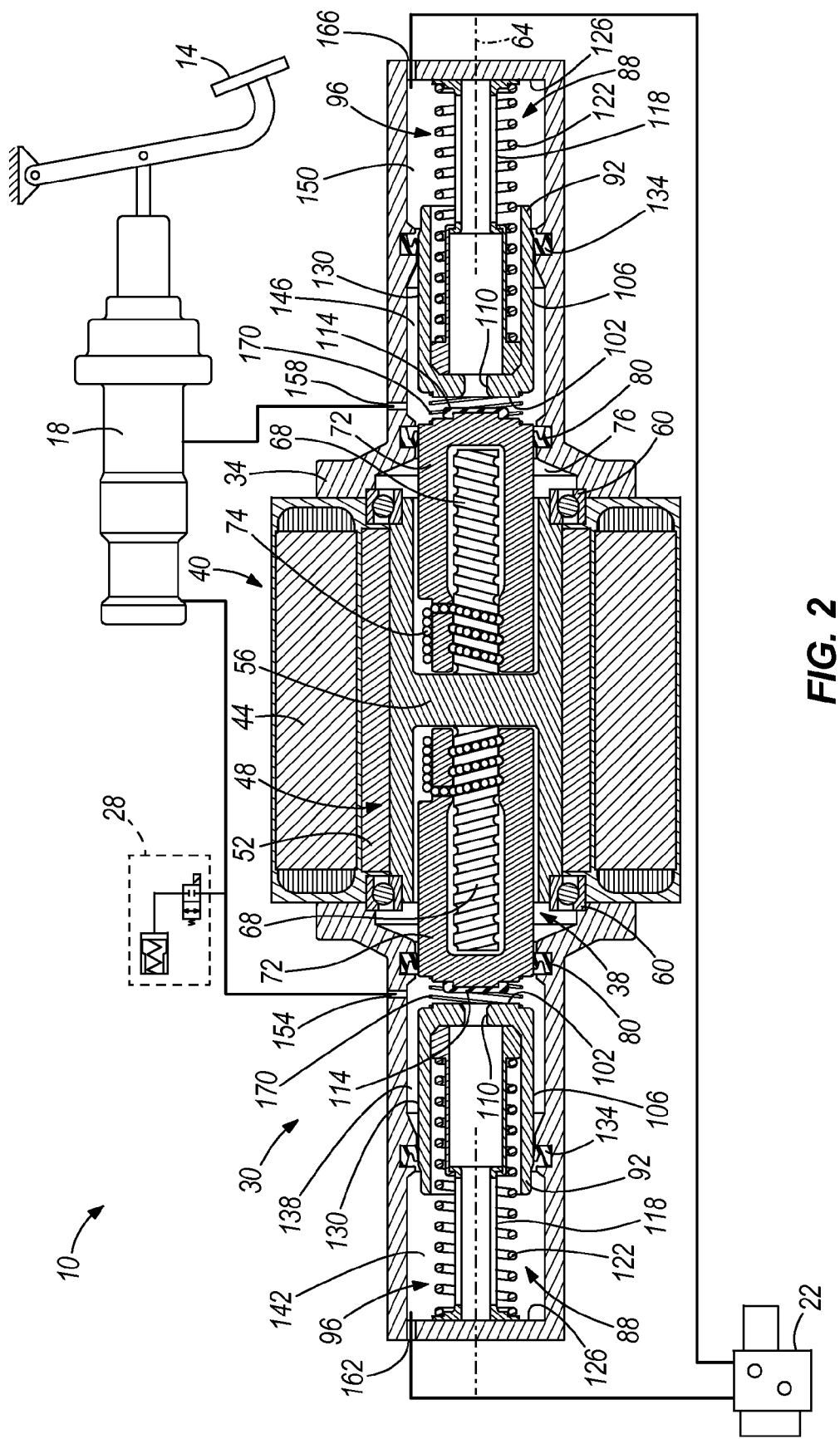
FIG. 2 is a section and partially schematic view of a brake booster of the hydraulic braking system of FIG. 1, shown in a rest position.

With reference to FIG. 2, the housing 34 further supports a pair of piston assemblies 88, which in the illustrated embodiment are substantially identical to one another and are oriented in mirror-image relationship to one another, one on each side of the screw drive arrangement 38. Each piston assembly 88 includes a piston 92 and a biasing arrangement 96, and in the illustrated embodiment, is co-axial with the longitudinal axis 64. Each piston 92 has an end wall 102 and a skirt 106. The end wall 102 includes an opening 110, the purpose of which will be described in detail below. The end wall 102 is in facing relation to a sealing surface 114 of a respective one of the nuts 72. The sealing surfaces 114 can include a seal member or can be formed from a material that achieves sealing. The biasing arrangement 96 is at least partially positioned within the skirt 106 and includes a support member 118 that at least partially supports a biasing member 122. In the illustrated embodiment, the support member 118 is a telescoping member having one end abutting an end wall 126 of the housing 34 and having another end abutting at least one of the end wall 102 and the skirt 106 of the piston 92. The biasing member 122 (e.g., a compression spring) surrounds the support member 118 and biases the piston 92 away from the end wall 126 and toward the screw drive arrangement 38.

Referring again to FIG. 4, the outer surface of the skirt 106 defines a generally cylindrical piston outer surface 130 with a substantially constant outer surface dimension $D_p$ (e.g., a substantially constant outer diameter). In other embodiments, the pistons 92 can be configured to have other geometries (e.g., oval, square, etc.) for the outer surface, resulting in corresponding outer surface dimensions $D_p$. In the illustrated embodiment, the outer surface dimension $D_p$ of the pistons 92, regardless of the particular geometry, is substantially equal to the outer surface dimensions $D_n$ of the nuts 72, for reasons that will be discussed in further detail below.

A pair of seals 134 is supported by the housing 34 on opposite sides of the screw drive arrangement 38, one seal 134 being in sealing engagement with the outer surface 130 of one of the pistons 92, and the other seal 134 being in sealing engagement with the outer surface 130 of the other piston 92. Together, the housing 34, the piston assemblies 88 (and namely the pistons 92), and the seals 80 and 134 define a first fluid chamber 138, a second fluid chamber 142, a third fluid chamber 146, and a fourth fluid chamber 150. In the illustrated embodiment, all of the fluid chambers 138, 142, 146, and 150 are coaxial with the longitudinal axis 64 of the screw drive arrangement 38. The first and third fluid chambers 138, 146 are on opposite sides of and immediately adjacent the screw drive chamber 76. The first fluid chamber 138 has an opening 154 in fluid communication with the master cylinder 18 for transferring hydraulic fluid between the first fluid chamber 138 and the master cylinder 18. The third fluid chamber 146 has an opening 158 in fluid communication with the master cylinder 18 for transferring hydraulic fluid between the third fluid chamber 146 and the master cylinder 18.

The second fluid chamber 142 has an opening 162 in fluid communication with the hydraulic control unit 22 for transferring hydraulic fluid between the second fluid chamber 142 and the hydraulic control unit 22. The fourth fluid chamber 150 has an opening 166 in fluid communication with the hydraulic control unit 22 for transferring hydraulic fluid between the fourth fluid chamber 150 and the hydraulic control unit 22. Together, the opening 154, the first fluid chamber 138, the second fluid chamber 142, and the opening 162 define one circuit, while the opening 158, the third fluid chamber 146, the fourth fluid chamber 150, and the opening 166 define a second circuit.

When the sealing surface 114 of the nut 72 in the first fluid chamber 138 is engaged with the respective piston end wall 102 to seal the opening 110 (see FIGS. 3-6 and 8-12), the first and second fluid chambers 138 and 142 are fluidly isolated from one another such that hydraulic fluid in the first fluid chamber 138 cannot flow into the second fluid chamber 142. This fluid isolation provides a decoupling of the brake pedal 14 from the wheel brakes 26, meaning that there will not be pedal feedback felt at the brake pedal 14 during braking events such as anti-lock (ABS) or adaptive cruise control (ACC) braking events. When the sealing surface 114 of the nut 72 in the first fluid chamber 138 is disengaged from the respective piston end wall 102, thereby leaving the opening 110 unsealed (see FIGS. 2 and 7), the first and second fluid chambers 138 and 142 are not fluidly isolated from one another and hydraulic fluid in the first fluid chamber 138 can flow freely into the second fluid chamber 142. Likewise, when the sealing surface 114 of the nut 72 in the third fluid chamber 146 is engaged with the respective piston end wall 102 to seal the opening 110 (see FIGS. 3-6 and 8-12), the third and fourth fluid chambers 146 and 150 are fluidly isolated from one another such that hydraulic fluid in the third fluid chamber 146 cannot flow into the fourth fluid chamber 150. Again, this fluid isolation provides a decoupling of the brake pedal 14 from the wheel brakes 26, meaning that there will not be pedal feedback felt at the brake pedal 14 during braking events such as anti-lock (ABS) or adaptive cruise control (ACC) braking events. When the sealing surface 114 of the nut 72 in the third fluid chamber 146 is disengaged from the respective piston end wall 102, thereby leaving the opening 110 unsealed (see FIGS. 2 and 7), the third and fourth fluid chambers 146 and 150 are not fluidly isolated from one another and hydraulic fluid in the third fluid chamber 146 can flow freely into the fourth fluid chamber 150.

Operation of the hydraulic braking system 10 will now be discussed with respect to FIGS. 2-8. FIG. 2 illustrates a rest position of the booster 30, in which the driver is depressing the accelerator pedal (not shown), and is not depressing the brake pedal 14. In this position, the nuts 72 are both at their inwardly-most refracted positions, such that the sealing surfaces 114 are disengaged from the respective piston end walls 102. Respective anti-rotation and biasing members 170 are coupled between the adjacent nut 72 and piston end wall 102. In the rest position illustrated in FIG. 2, the members 170 operate to bias the nuts 72 away from the respective pistons 92 and toward the illustrated center-most, rest position. Specifically, if no torque is being applied to the rotor 48 by the motor 40, the biasing members 170 will cause the nuts 72 to translate to the illustrated rest position. The members 170 will also prevent relative rotation between the respective piston 92 and nut 72. The illustrated biasing members 170 are compression springs.

FIG. 3 illustrates a stand-by position of the booster 30, in which the sealing surfaces 114 of the nuts 72 engage the respective piston end walls 102 so that the openings 122 are sealed. The first and second, and third and fourth fluid chambers 138, 142 and 146, 150 are fluidly isolated from one another. This stand-by position occurs when the user lets off of the accelerator pedal (i.e., is not depressing the accelerator pedal) but has not yet depressed the brake pedal 14. The system 10 is anticipating a possible future braking scenario. The motor 40 is actuated via a controller by a sensor that detects the non-depressed position of the accelerator pedal, or by some other engine parameter sensor, and current is applied to the motor 40 to cause the rotor 48 to be rotated, moving the nuts 72 into engagement with the respective pistons 92 enough to cause the sealing surfaces 114 to seal the respective openings 122. The biasing force of the members 170 is overcome by movement of the nuts 72, however, the biasing force of the biasing arrangements 96 is not yet overcome to move the piston 92 by any significant amount. The torque applied to the rotor 48 is controlled to achieve this stand-by position.

FIG. 4 illustrates a user-actuated braking operation, in which the user is applying force to the brake pedal 14 for desired braking The controller coupled to the motor 40 determines or senses at least one of brake pedal travel, force applied to the brake pedal 14, and master cylinder pressure to signal to the motor 40 to apply an associated amount of additional torque to the rotor 48, thereby causing further movement of the nuts 72 toward the respective pistons 92. The engagement between the nut sealing surfaces 114 and the respective piston end walls 102 forces the pistons 92 away from the screw drive chamber 76, overcoming the bias of the biasing arrangements 96. The volume of the second and fourth fluid chambers 142, 150 is varied (i.e., reduced), causing hydraulic fluid in the second and fourth fluid chambers 142, 150 to be pressurized to a pressure P2 that is greater than a pressure P1 generated in the master cylinder 18 and present in the first and third fluid chambers 138, 146 (see also FIGS. 9 and 11). The fluid in the second fluid chamber 142 is forced through the opening 162 and to the hydraulic control unit 22 for controlled application to one or more of the wheel brakes 26. Likewise, the fluid in the fourth fluid chamber 150 is forced through the opening 166 and to the hydraulic control unit 22 for controlled application to one or more different wheel brakes 26. All or almost all of the work performed on the pistons 92 is a result of the movement of the nuts 72 by the motor 40.

Pressurized fluid at pressure P1 will flow from the master cylinder 18 into the first and third fluid chambers 138, 146, but is prevented from flowing directly into the isolated second and fourth fluid chambers 142, 150. Likewise, flow from the second and fourth fluid chambers 142, 150 back into the respective first and third fluid chambers 138, 146 is prevented. This results in a decoupling of the brake pedal 14 from the wheels, eliminating pedal feedback commonly observed during anti-lock braking, traction control braking, adaptive cruise control operation, and other non-user-initiated braking situations. The hydraulic braking system 10 is also completely independent of engine vacuum.

The first and third fluid chambers 138, 146 also each maintain a constant volume due to the fact that the respective outer dimension $D_n$ and $D_p$ are equal. No matter how much translational movement occurs between the engaged nuts 72 and pistons 92, the volume of the first and third fluid chambers 138, 146 remains the same. This results in a lack of change in pedal feel as the user applies force to the brake pedal 14. The optional pedal feel simulator 28 can be used if desired to provide a conventional pedal feel. However, the constant volume feature of the first and third fluid chambers 138, 146 provides an additional advantage for recuperative braking applications, as will be described further below.

FIG. 5 illustrates a returning position of the booster 30 after a user has stopped actuating braking (i.e., has stopped applying pressure to the brake pedal 14). The controller signals the motor 40 to reverse the torque to the rotor 48, causing the nuts 72 to retract toward the rest position. The biasing arrangements 96 maintain the piston end walls 102 in the engaged and sealed condition with the nut sealing surfaces 114 during the retraction. Eventually, the nuts 72 and pistons 92 will return all the way to the rest position shown in FIG. 2 if no further force is applied to the brake pedal 14.

Figure 6:
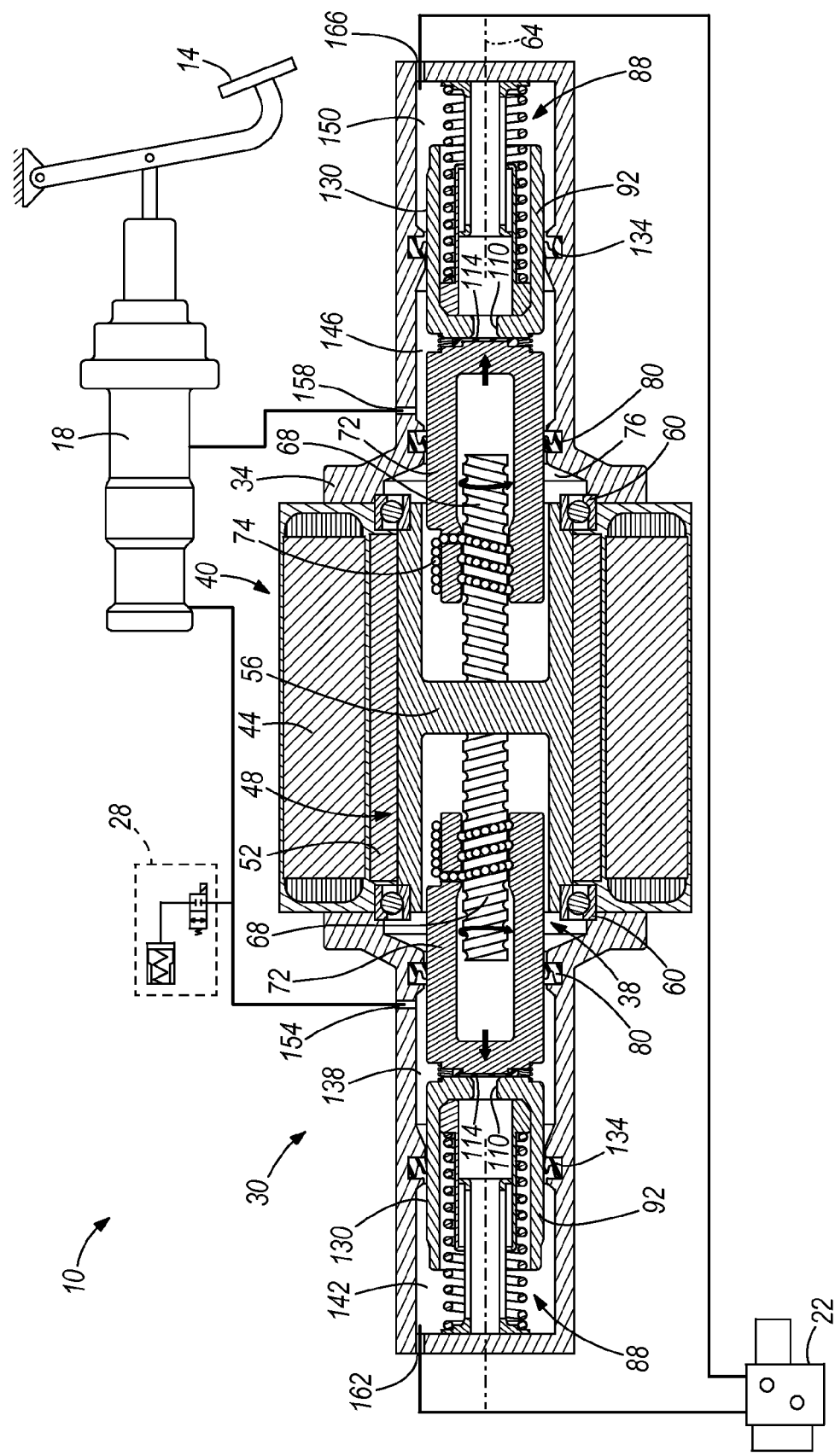
FIG. 6 is a section and partially schematic view of the brake booster of FIG. 2, shown in a non-user-actuated braking position.

FIG. 6 illustrates a non-user-actuated braking position of the booster 30, such as operation of adaptive cruise control. In this state, the user does not depress the brake pedal 14 at all, but instead, braking is initiated wholly by a vehicle system. The controller signals the motor 40 to apply torque, causing the nuts 72 to engage and move the pistons 92 as desired based on the needs of the vehicle system.

Figure 7:
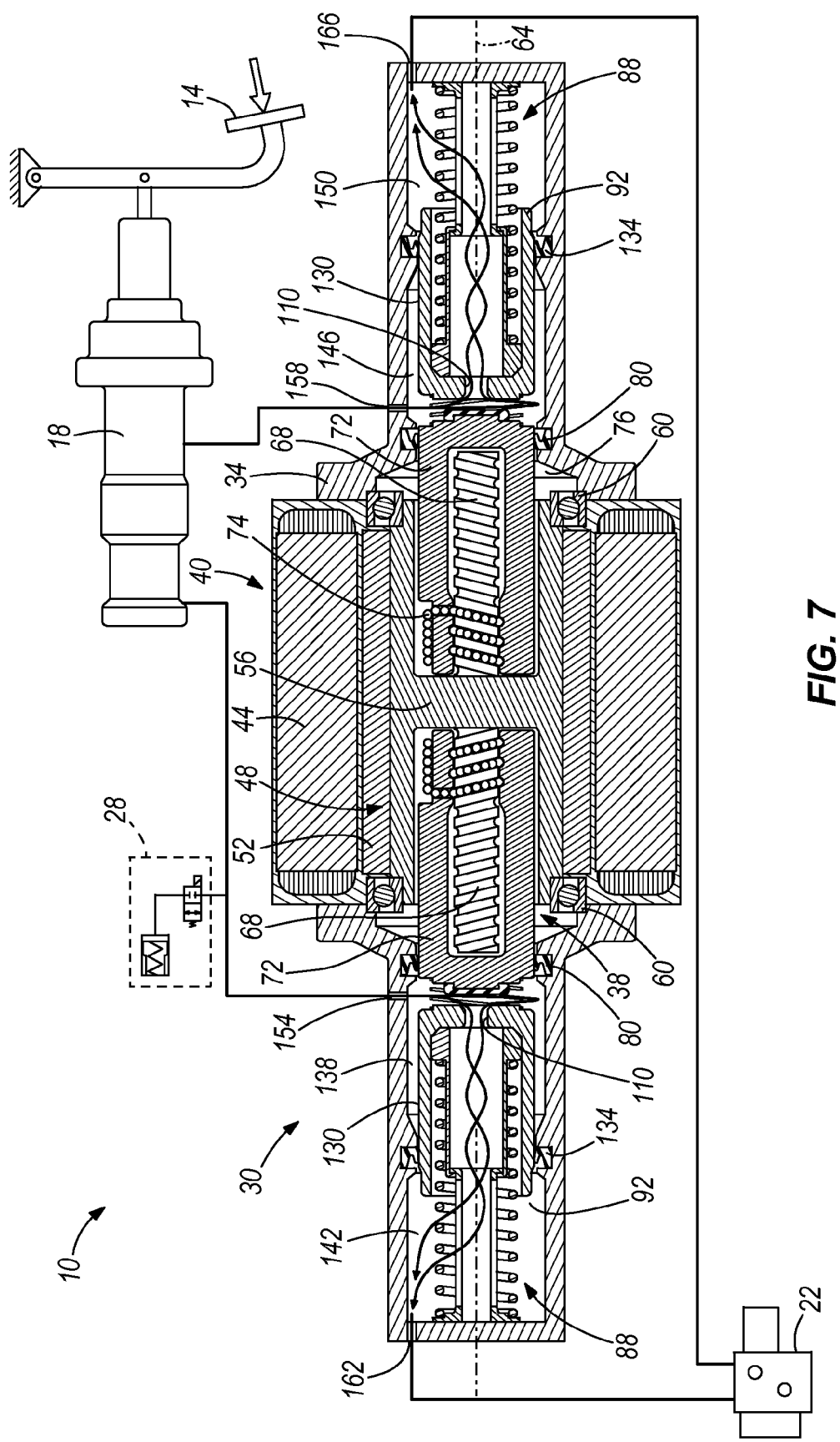
FIG. 7 is a section and partially schematic view of the brake booster of FIG. 2, shown in a user-actuated braking position when the vehicle has experienced an electrical failure or booster motor failure.

FIG. 7 illustrates a user-actuated braking position of the booster 30 when the vehicle has experienced an electrical failure or booster motor failure that renders the motor 40 inoperable. To ensure that the vehicle is still capable of being stopped, hydraulic fluid pressurized in the master cylinder 18 by the user's depression of the brake pedal 14 enters each of the first and third fluid chambers 138, 146 through the respective openings 154, 158, can pass directly through the openings 122 into the second and fourth fluid chambers 142, 150, can continue through the respective openings 162, 166, and to the hydraulic control unit 22. The hydraulic control unit 22 therefore still has pressurized hydraulic fluid to control wheel braking In this condition, the booster 30 does not provide resistance to manual pressure increase by the user. Furthermore, since there is no vacuum booster present, there is no resistance force to the user that is otherwise associated with the force of a diaphragm return spring of a vacuum booster (e.g., greater than 200N of resistance force).

Figure 8:
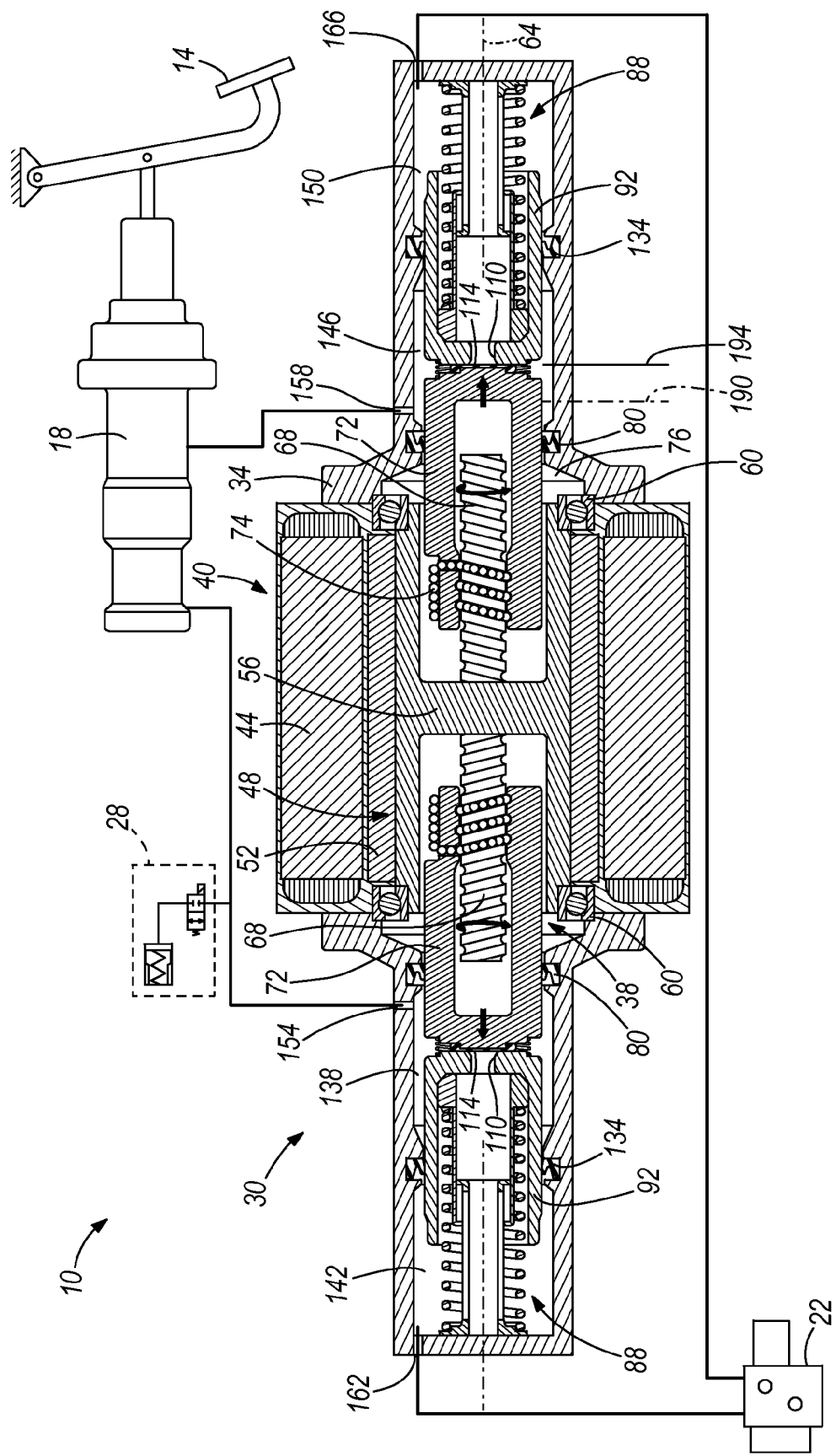
FIG. 8 is a section and partially schematic view of the brake booster of FIG. 2, showing a dead stroke adjustment capability of the brake booster.

FIG. 8 illustrates a dead stroke adjustment capability of the booster 30. The booster 30 can be controlled to account for or adjust for dead stroke, which is what causes the softness in the feel of the brake pedal 14 due to the large travel required of the brake pedal 14 before pressure is applied to the wheel brakes 26. As shown in FIG. 8, the stand-by position can be adjusted from that shown in FIG. 3 (as indicated by dashed line 190) to an adjusted position (as indicated by the line 194) in which the nuts 72 are controlled to exert more outward force on, and cause more movement of, the pistons 92. In this adjusted stand-by position, when the user depresses the brake pedal 14, less softness or dead stroke will exist, giving the brakes a harder, or more responsive feel. This adjustment is controlled by the controller having the motor 40 apply a bit more torque to the rotor 48 to drive the nuts 72 a bit further than was done in the FIG. 3 stand-by position. The amount of adjustment can be varied to provide the desired brake feel. This feature can be useful, for example, in conjunction with high-retraction/low-drag calipers.

Figure 9:
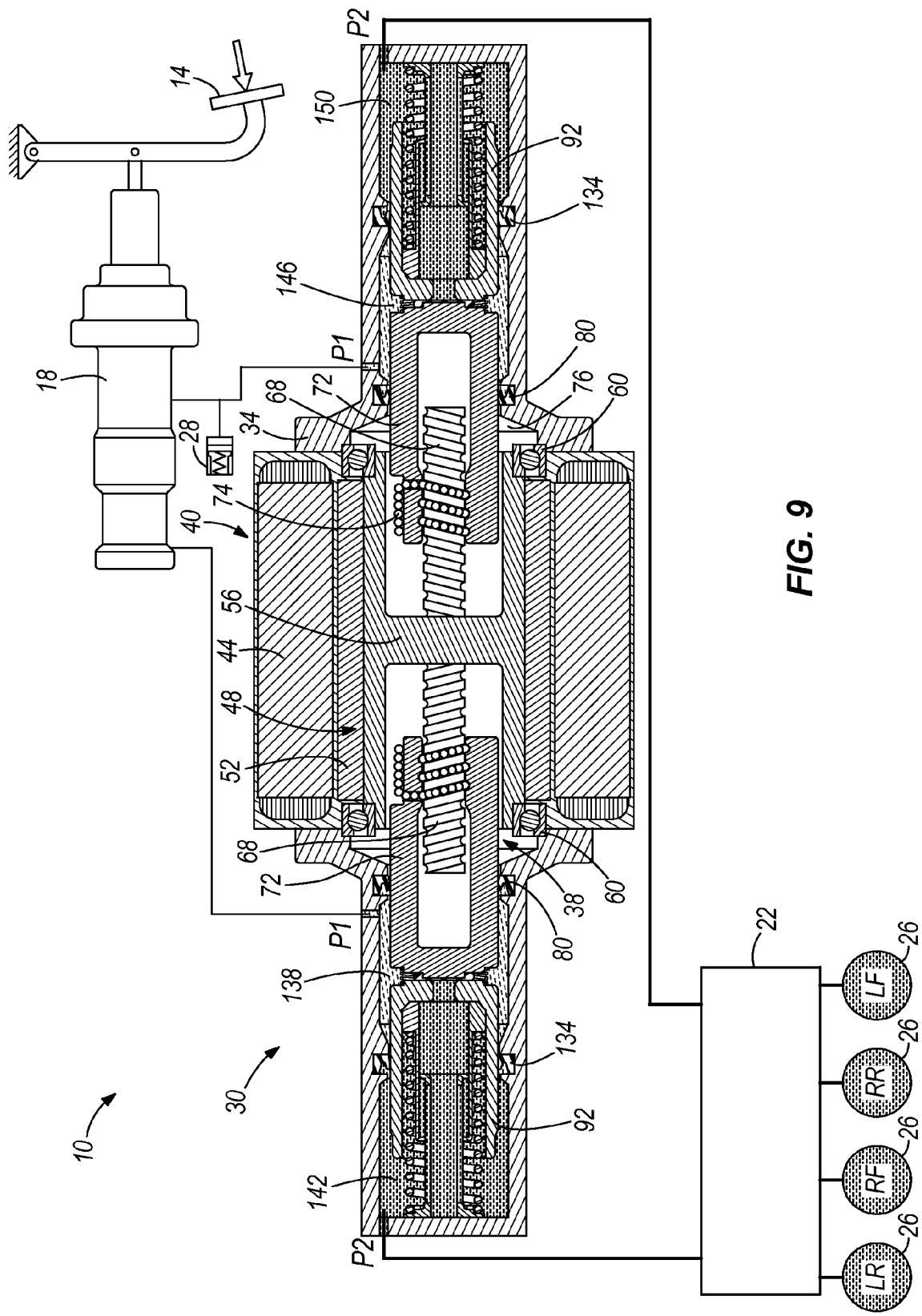
FIG. 9 is a section and partially schematic view of the brake booster of FIG. 2, illustrating system pressures before initiation of front axle pressure control recuperative braking
Figure 10:
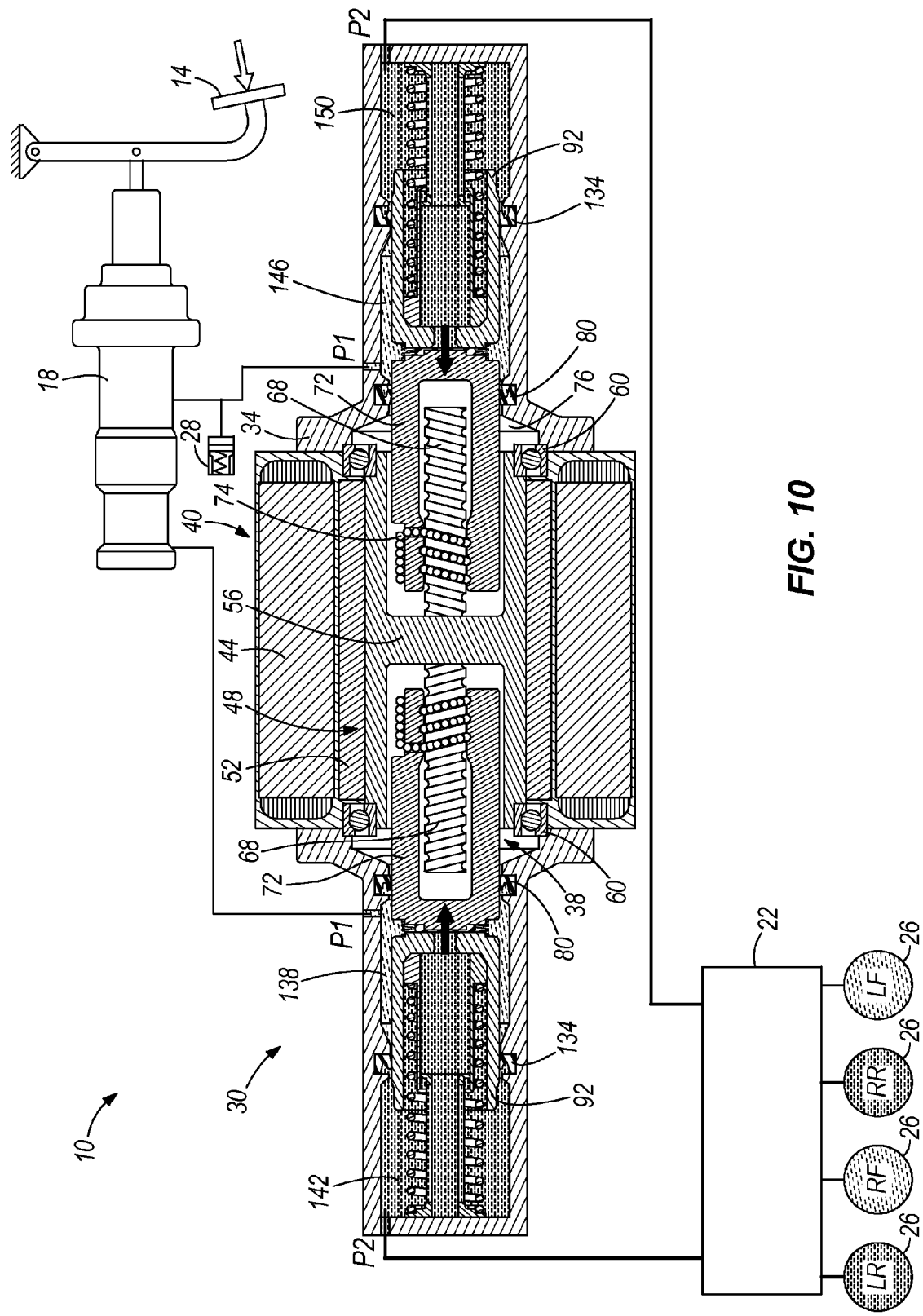
FIG. 10 is a section and partially schematic view of the brake booster of FIG. 2, illustrating system pressures at initiation of front axle pressure control recuperative braking

As mentioned above, the constant volume feature of the first and third fluid chambers 138, 146 provides an additional advantage for recuperative braking applications, such as those used in hybrid or pure electric vehicles. FIGS. 9 and 10 illustrate a first mode of recuperative braking in which the hydraulic control unit 22 is used to balance brake pressures when recuperative engine braking is applied to, for example, the front axle. FIG. 9 illustrates the hydraulic braking system 10 at a state before recuperation. A first pressure P1 is present in first and third fluid chambers 138, 146, and the second, higher pressure P2 is present in the second and fourth fluid chambers 142, 150 as generated by the booster 30 in the manner described above. The hydraulic control unit 22 is operable, through its series of valves, to apply the second pressure P2 to all four of the wheel brakes 26. FIG. 10 illustrates what happens at the start of a recuperative braking event. The electronic stability program uses the motor in the hydraulic control unit 22 to substantially balance the brake pressures at all four wheel brakes in response to the regenerative torque performing engine braking at the front axle. When this occurs, less hydraulic pressure is required at the front axle for the front axle wheel brakes 26. As such, the hydraulic control unit 22 can selectively apply only the lower first pressure P1 (or some other lower pressure) to the wheel brakes 26 on the front axle, while applying the higher second pressure P2 to the wheel brakes 26 on the rear axle.

Due to the constant volume of the first and third fluid chambers 138, 146, there will be no feedback to the driver's foot through the brake pedal 14 during the transition to or operation of the recuperative braking event, despite the operation of the hydraulic control unit 22 in modulating hydraulic pressure to the particular wheel brakes 26. This makes the brake booster 30 especially useful for this type of recuperative braking system.

Figure 11:
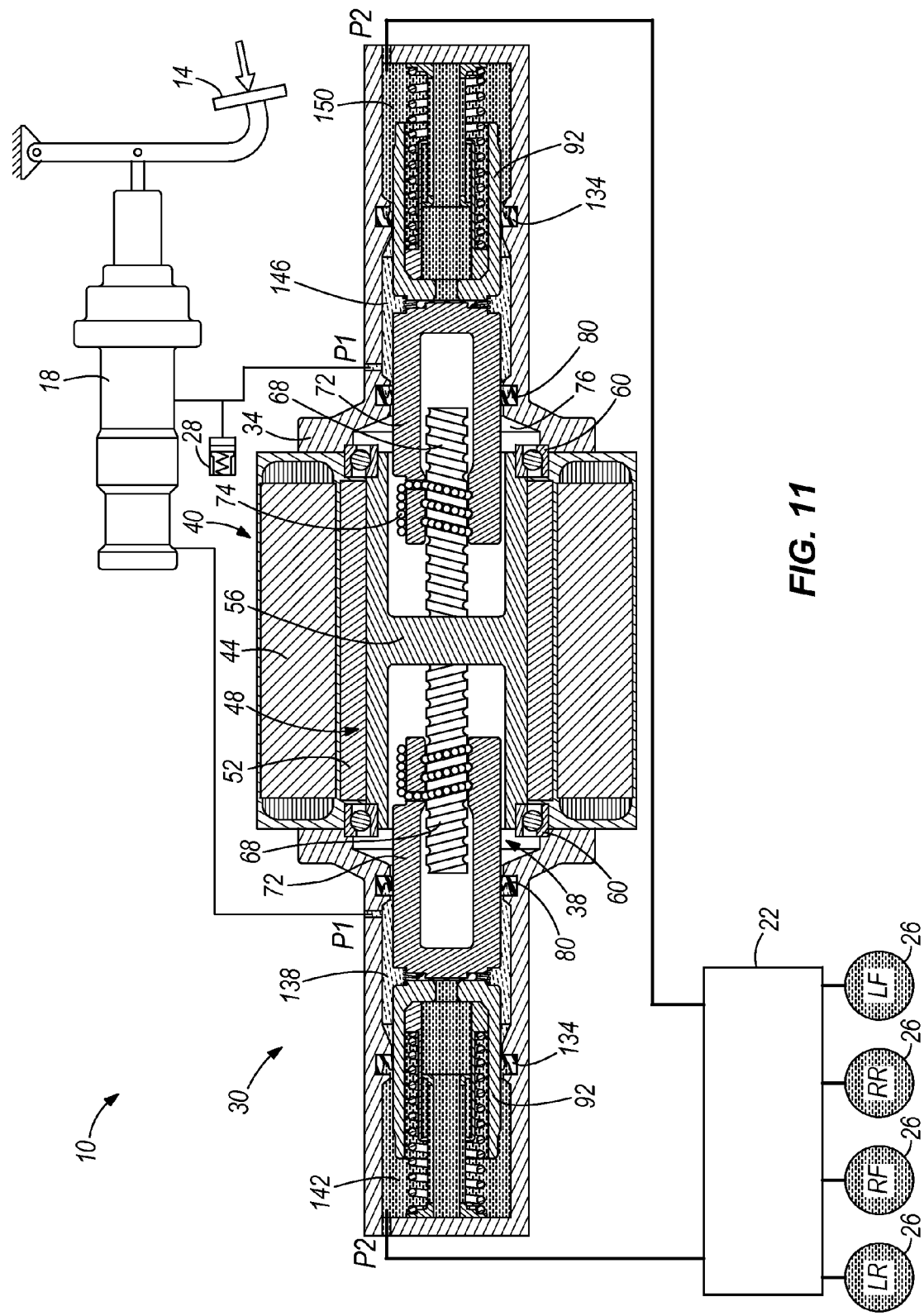
FIG. 11 is a section and partially schematic view of the brake booster of FIG. 2, illustrating system pressures before initiation of four wheel pressure control recuperative braking
Figure 12:
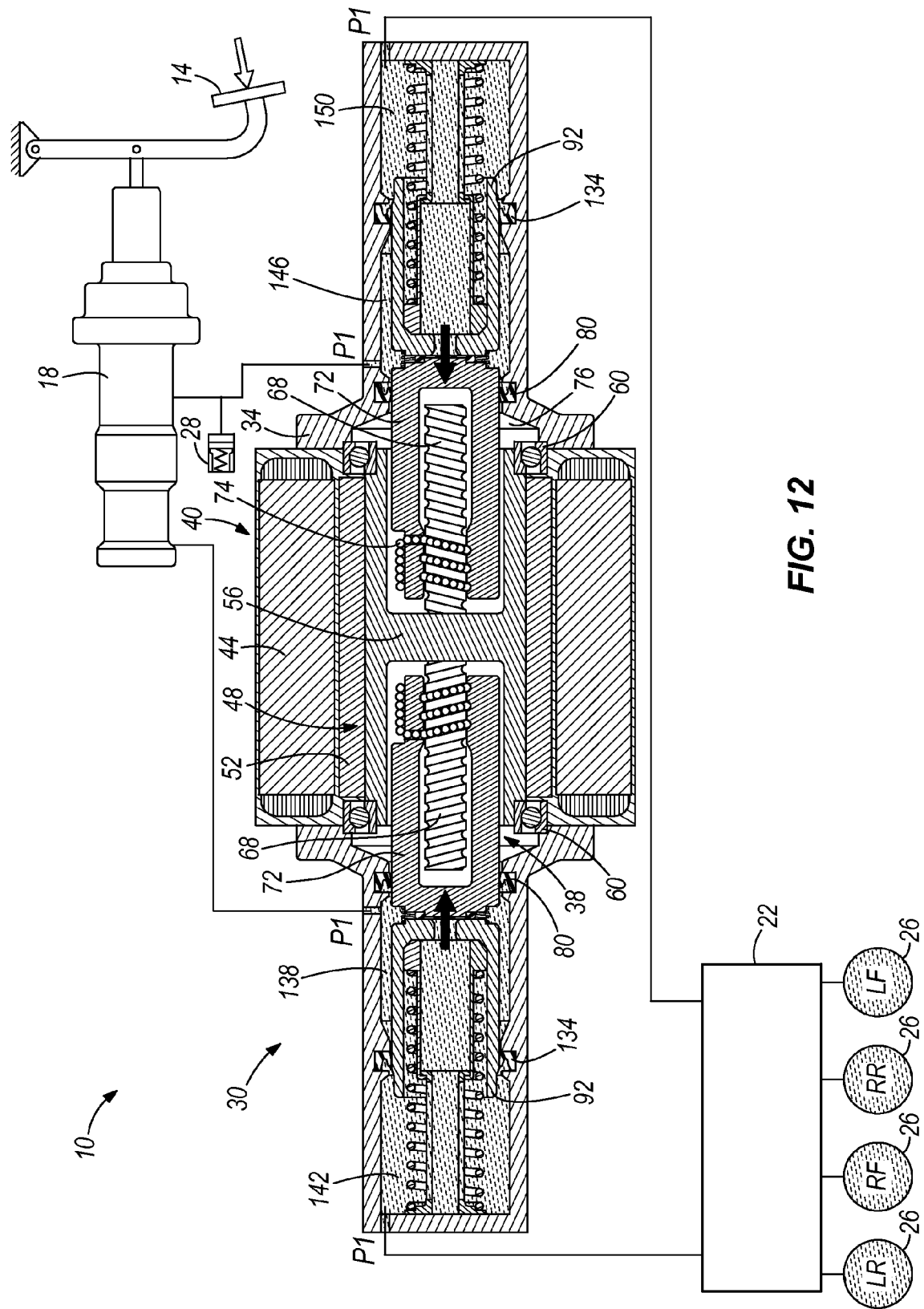
FIG. 12 is a section and partially schematic view of the brake booster of FIG. 2, illustrating system pressures at initiation of four wheel pressure control recuperative braking

FIGS. 11 and 12 illustrate a four wheel pressure control recuperative braking capability of the booster 30. FIG. 11 again illustrates the system pressures prior to the start of recuperation. In this system, regenerative engine braking that could be applied to one axle or both axles takes place and no electronic stability program is utilized for balancing the wheel brake pressures. When recuperation starts in FIG. 12 the booster 30 reduces the output pressure to the lower first pressure P1 (via control of the motor torque applied to the screw drive arrangement 38) to compensate for the engine braking taking place. The hydraulic control unit 22, without attempting to compensate for or balance pressures at the four wheel brakes 26, simply applies the pressure P1 to all four wheel brakes 26. Again, due to the constant volume of the first and third fluid chambers 138, 146, there will be no feedback to the driver's foot through the brake pedal 14 during the transition to or operation of the recuperative braking event, which in this case is compensated for by the booster 30 instead of the hydraulic control unit 22. This again makes the brake booster 30 especially useful for recuperative braking systems.

FIGS. 13-19 illustrate a second embodiment of a brake booster 30' according to the present invention for use in a hydraulic braking system 10' having a brake pedal 14, a master cylinder 18, and a hydraulic control unit 22. The brake booster 30' is similar in many respects to the brake booster 30, and like parts have been given like reference numerals designated with a prime symbol ('). Only the differences from the brake booster 30 will be discussed in detail below.

The booster 30' includes a modified screw drive arrangement 200. The illustrated rotor 204 includes a permanent magnet 208 and a nut 212 of the screw drive arrangement 200. The nut defines first and second nut portions 212a, 212b. The rotor 204 is rotatably supported by angular bearings 60' that permit limited translation of the rotor 204 along a longitudinal axis 64' of the screw drive arrangement 200.

The illustrated screw drive arrangement 200 is symmetrically configured to simultaneously provide two separate, mirror-image drive arrangements, each being coaxial with the longitudinal axis 64'. This enables the single booster 30' to operate for all four wheel brakes 26 with two separate inputs and outputs. However, in other embodiments, the booster 30' need not have this dual, symmetrical arrangement, but instead can take the form of two completely separate boosters, each operating in a manner similar to one half (e.g., the left side or the right side) of the illustrated booster 30'.

Figure 14:
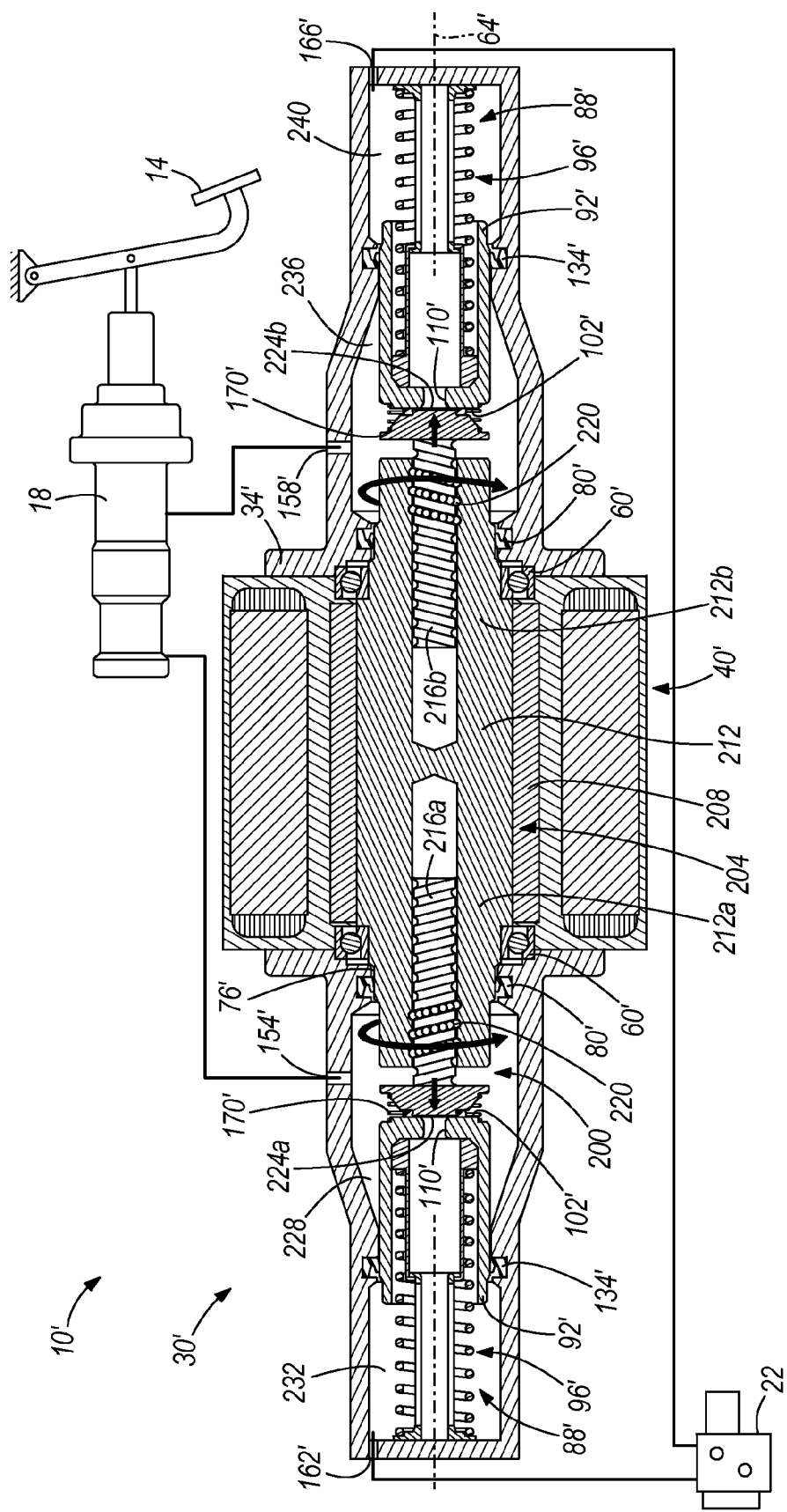
FIG. 14 is a section and partially schematic view of the brake booster of FIG. 13, shown in a stand-by position.
Figure 15:
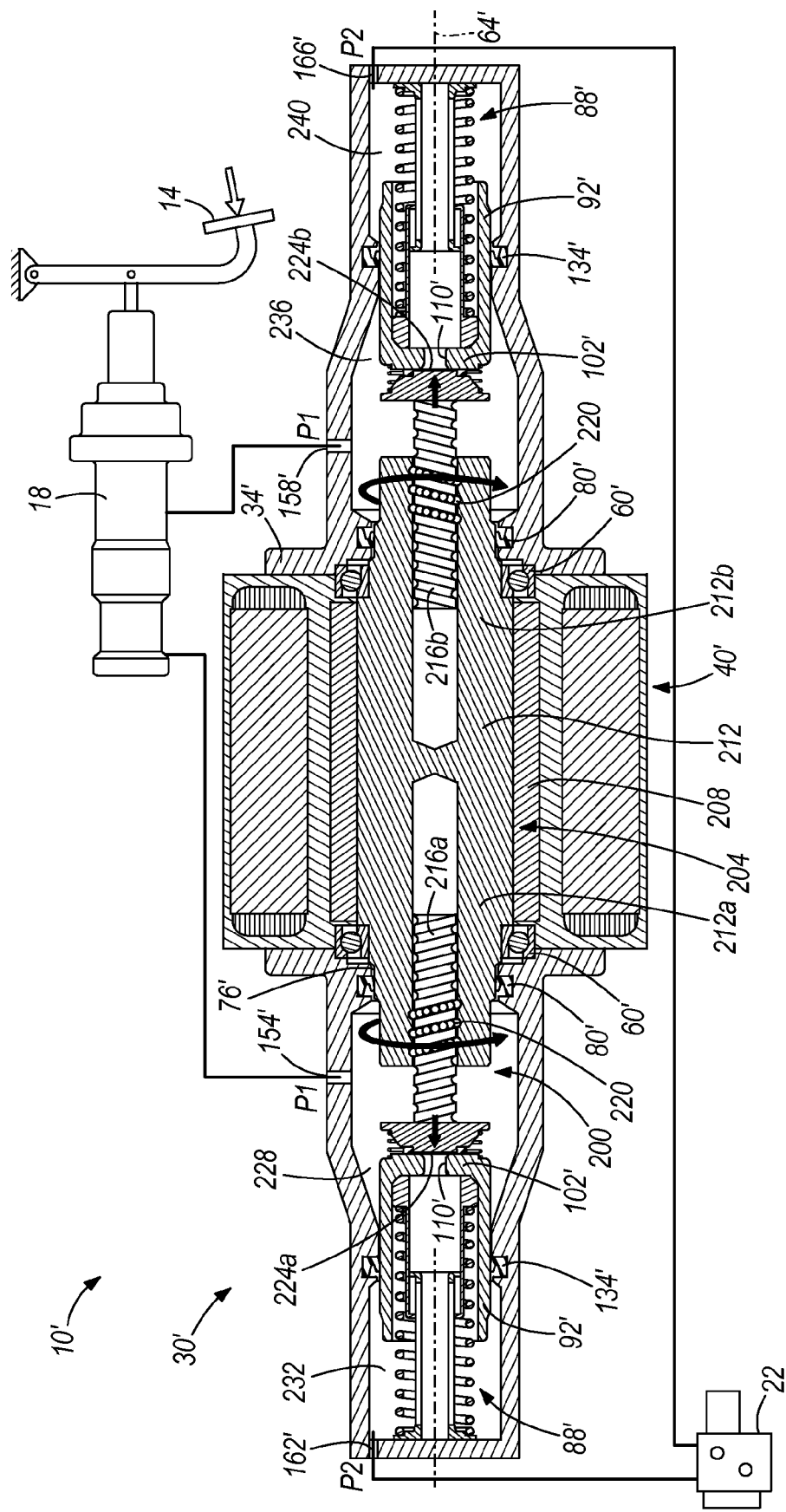
FIG. 15 is a section and partially schematic view of the brake booster of FIG. 13, shown in a user-actuated braking position.
Figure 16:
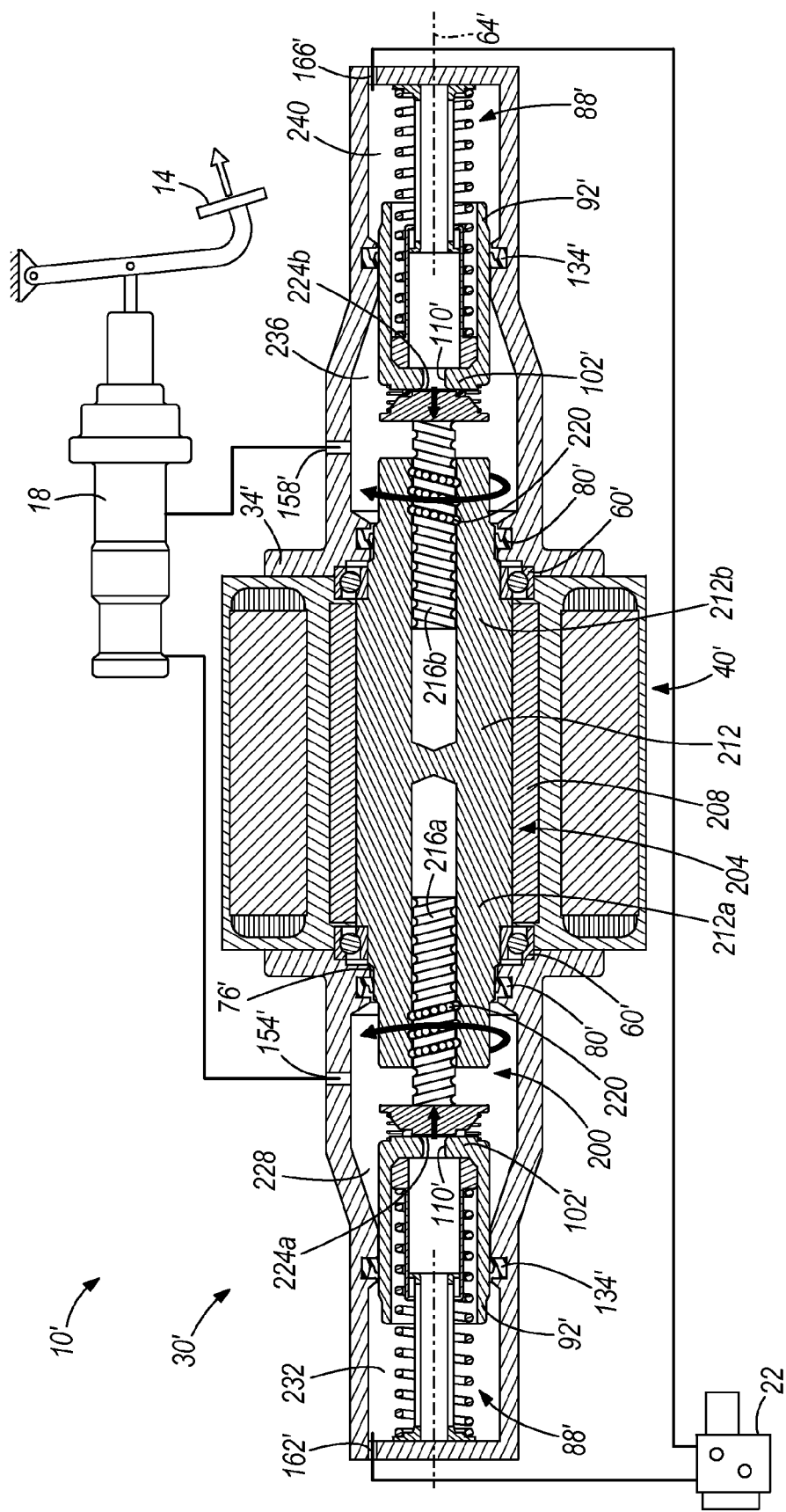
FIG. 16 is a section and partially schematic view of the brake booster of FIG. 13, shown in a returning position after a user has stopped actuating braking

Each drive arrangement further includes a screw 216a, 216b received in the respective nut portion 212a, 212b of the nut 212. As the nut 212 rotates with the rotor 204 in a first direction, the screws 216a, 216b move (e.g., translate) in a first direction. With reference to FIGS. 14 and 15, rotation of the rotor 204 in a first direction causes the nut 212 to rotate, thereby causing the screw 216a on the left side to translate to the left and the screw 216b on the right side to translate to the right. Likewise, as shown in FIG. 16, rotation of the rotor 204 in a second direction opposite the first direction causes the nut 212 to rotate in the opposite manner, thereby causing the screw 216a on the left side to translate to the right and the screw 216b on the right side to translate to the left. The illustrated screw drive arrangement 200 is a ball screw drive, further including a plurality of balls 220 positioned between each screw 216a, 216b and its respective nut portion 212a, 212b (e.g., in respective grooves or threads as is conventionally understood).

Each screw 216a, 216b includes a respective sealing surface 224a, 224b configured to selectively abut the respective end wall 102' of the pistons 92' to seal the opening 110' for the same reasons described above with respect to the booster 30. The sealing surfaces 224a, 224b can include a seal member or can be formed from a material that achieves sealing. Respective anti-rotation and biasing members 170' are coupled between the screws 216a, 216b and the respective piston end wall 102'. In the rest position illustrated in FIG. 13, the members 170' operate to bias the screws 216a, 216b away from the respective pistons 92' and toward the illustrated center-most, rest position. Specifically, if no torque is being applied to the rotor 204 by the motor 40', the biasing members 170' will cause the screws 216a, 216b to translate to the illustrated rest position. The members 170' will also prevent relative rotation between the respective piston 92' and screws 216a, 216b. The illustrated biasing members 170' are compression springs.

Together, the housing 34', the piston assemblies 88' (and namely the pistons 92'), and the seals 80' and 134' define a first fluid chamber 228, a second fluid chamber 232, a third fluid chamber 236, and a fourth fluid chamber 240. In the illustrated embodiment, all of the fluid chambers 228, 232, 236, and 240 are coaxial with the longitudinal axis 64' of the screw drive arrangement 200. The first and third fluid chambers 228, 236 are on opposite sides of and immediately adjacent the screw drive chamber 76'. The fluid chambers 228, 232, 236, and 240 have the same openings 154', 158', 162', and 166' as described above with respect to the openings 154, 158, 162, and 166.

Together, the opening 154', the first fluid chamber 228, the second fluid chamber 232, and the opening 162' define one circuit, while the opening 158', the third fluid chamber 236, the fourth fluid chamber 240, and the opening 166' define a second circuit. When the sealing surface 224a of the screw 216a in the first fluid chamber 228 is engaged with the respective piston end wall 102' to seal the opening 110' (see FIGS. 14-17 and 19), the first and second fluid chambers 228 and 232 are fluidly isolated from one another such that hydraulic fluid in the first fluid chamber 228 cannot flow into the second fluid chamber 232. This fluid isolation provides a decoupling of the brake pedal 14 from the wheel brakes 26, meaning that there will not be pedal feedback felt at the brake pedal 14 during braking events such as anti-lock (ABS) or adaptive cruise control (ACC) braking events. When the sealing surface 224a of the screw 216a in the first fluid chamber 228 is disengaged from the respective piston end wall 102', thereby leaving the opening 110' unsealed (see FIGS. 13 and 18), the first and second fluid chambers 228 and 232 are not fluidly isolated from one another and hydraulic fluid in the first fluid chamber 228 can flow freely into the second fluid chamber 232.

Likewise, when the sealing surface 224b of the screw 216b in the third fluid chamber 236 is engaged with the respective piston end wall 102' to seal the opening 110' (see FIGS. 14-17 and 19), the third and fourth fluid chambers 236 and 240 are fluidly isolated from one another such that hydraulic fluid in the third fluid chamber 236 cannot flow into the fourth fluid chamber 240. Again, this fluid isolation provides a decoupling of the brake pedal 14 from the wheel brakes 26, meaning that there will not be pedal feedback felt at the brake pedal 14 during braking events such as anti-lock (ABS) or adaptive cruise control (ACC) braking events. When the sealing surface 224b of the screw 216b in the third fluid chamber 236 is disengaged from the respective piston end wall 102', thereby leaving the opening 110' unsealed (see FIGS. 13 and 18), the third and fourth fluid chambers 236 and 240 are not fluidly isolated from one another and hydraulic fluid in the third fluid chamber 236 can flow freely into the fourth fluid chamber 240.

Figure 13:
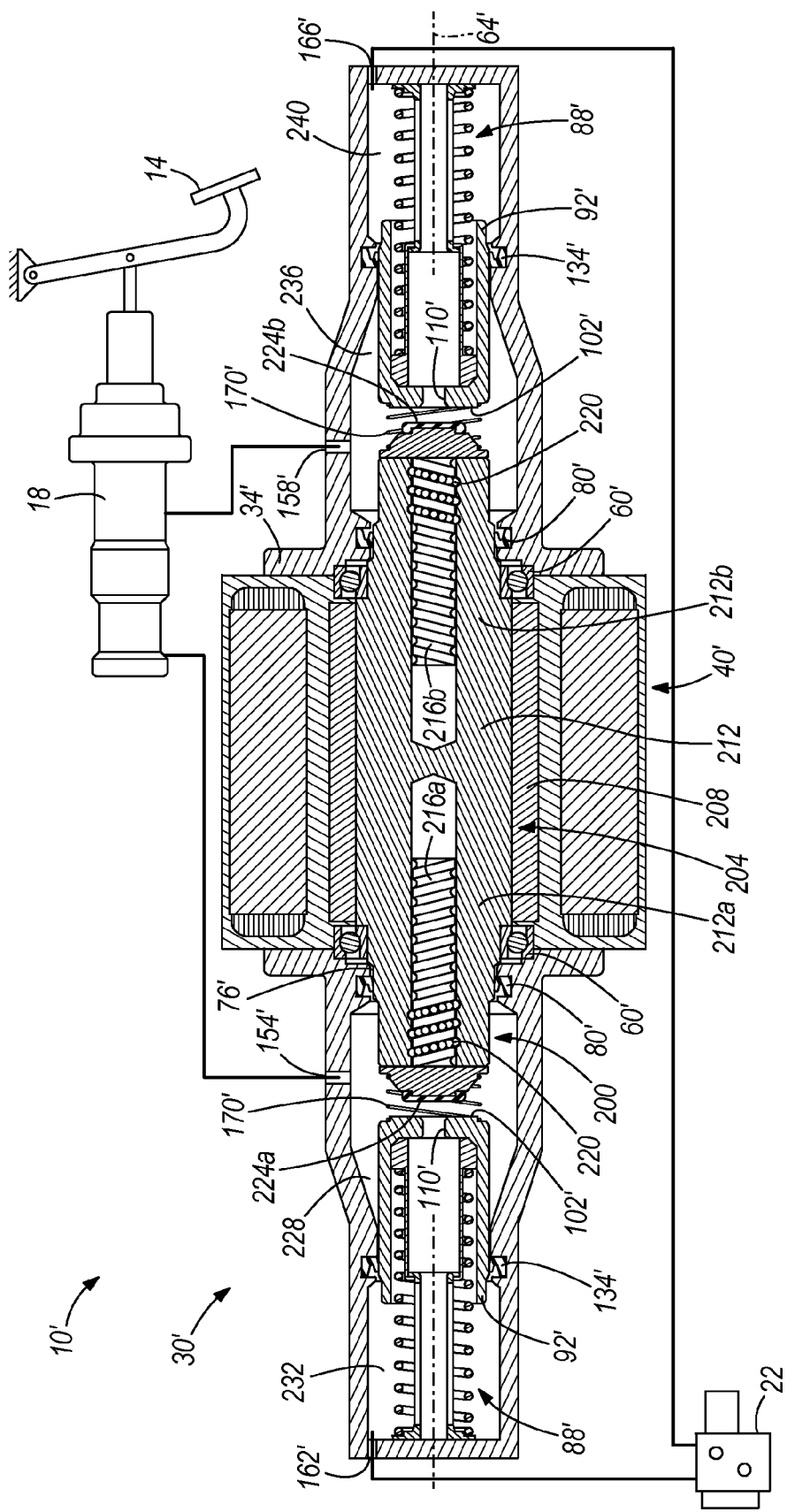
FIG. 13 is a section and partially schematic view of an alternative brake booster for a hydraulic braking system, shown in a rest position.

Operation of the hydraulic braking system 10' will now be discussed with respect to FIGS. 13-19. FIG. 13 illustrates a rest position of the booster 30', in which the driver is depressing the accelerator pedal (not shown), and is not depressing the brake pedal 14. In this position, the screws 216a, 216b are both at their inwardly-most retracted positions, such that the sealing surfaces 224a, 224b are disengaged from the respective piston end walls 102'. Respective anti-rotation and biasing members 170' are coupled between the adjacent screw 216a, 216b and piston end wall 102'. In the rest position illustrated in FIG. 13, the members 170' operate to bias the screws 216a, 216b away from the respective pistons 92' and toward the illustrated center-most, rest position. Specifically, if no torque is being applied to the rotor 204 by the motor 40', the biasing members 170' will cause the screws 216a, 216b to translate to the illustrated rest position. The members 170' will also prevent relative rotation between the respective piston 92' and screw 216a, 216b.

FIG. 14 illustrates a stand-by position of the booster 30', in which the sealing surfaces 224a, 224b of the screws 216a, 216b engage the respective piston end walls 102' so that the openings 122' are sealed. The first and second, and third and fourth fluid chambers 228, 232 and 236, 240 are fluidly isolated from one another. This stand-by position occurs when the user lets off of the accelerator pedal (i.e., is not depressing the accelerator pedal) but has not yet depressed the brake pedal 14. The system 10' is anticipating a possible future braking scenario. The motor 40' is actuated via a controller by a sensor that detects the non-depressed position of the accelerator pedal, or by some other engine parameter sensor, and current is applied to the motor 40' to cause the rotor 204 to be rotated, moving the screws 216a, 216b into engagement with the respective pistons 92' enough to cause the sealing surfaces 224a, 224b to seal the respective openings 122'. The biasing force of the members 170' is overcome by movement of the screws 216a, 216b, however, the biasing force of the biasing arrangements 96' is not yet overcome to move the piston 92' by any significant amount. The torque applied to the rotor 204 is controlled to achieve this stand-by position.

FIG. 15 illustrates a user-actuated braking operation, in which the user is applying force to the brake pedal 14 for desired braking The controller coupled to the motor 40' determines or senses at least one of brake pedal travel, force applied to the brake pedal 14, and master cylinder pressure to signal to the motor 40' to apply an associated amount of additional torque to the rotor 204, thereby causing further movement of the screws 216a, 216b toward the respective pistons 92'. The engagement between the sealing surfaces 224a, 224b and the respective piston end walls 102' forces the pistons 92' away from the screw drive chamber 76', overcoming the bias of the biasing arrangements 96'. The volume of the second and fourth fluid chambers 232, 240 is varied (i.e., reduced), causing hydraulic fluid in the second and fourth fluid chambers 232, 240 to be pressurized to a pressure P2 that is greater than a pressure P1 generated in the master cylinder 18 and present in the first and third fluid chambers 228, 236. The fluid in the second fluid chamber 232 is forced through the opening 162' and to the hydraulic control unit 22 for controlled application to one or more of the wheel brakes 26. Likewise, the fluid in the fourth fluid chamber 240 is forced through the opening 166' and to the hydraulic control unit 22 for controlled application to one or more different wheel brakes 26. All or almost all of the work performed on the pistons 92' is a result of the movement of the screws 216a, 216b by the motor 40'.

Pressurized fluid at pressure P1 will flow from the master cylinder 18 into the first and third fluid chambers 228, 236, but is prevented from flowing directly into the isolated second and fourth fluid chambers 232, 240. Likewise, flow from the second and fourth fluid chambers 232, 240 back into the respective first and third fluid chambers 228, 236 is prevented.

This results in a decoupling of the brake pedal 14 from the wheels, eliminating pedal feedback commonly observed during anti-lock braking, traction control braking, adaptive cruise control operation, and other non-user-initiated braking situations. The hydraulic braking system 10' is also completely independent of engine vacuum.

Unlike in the booster 30, the first and third fluid chambers 228, 236 do not maintain a constant volume during operation, meaning that there will be a change in brake pedal feel during user-initiated braking In this regard, the optional pedal feel simulator 28 used in the system 10 need not be used in the system 10'.

FIG. 16 illustrates a returning position of the booster 30' after a user has stopped actuating braking (i.e., has stopped applying pressure to the brake pedal 14). The controller signals the motor 40' to reverse the torque to the rotor 204, causing the screws 216a, 216b to retract toward the rest position. The biasing arrangements 96' maintain the piston end walls 102' in the engaged and sealed condition with the sealing surfaces 224a, 224b during the retraction. Eventually, the screws 216a, 216b and pistons 92' will return all the way to the rest position shown in FIG. 13 if no further force is applied to the brake pedal 14.

Figure 17:
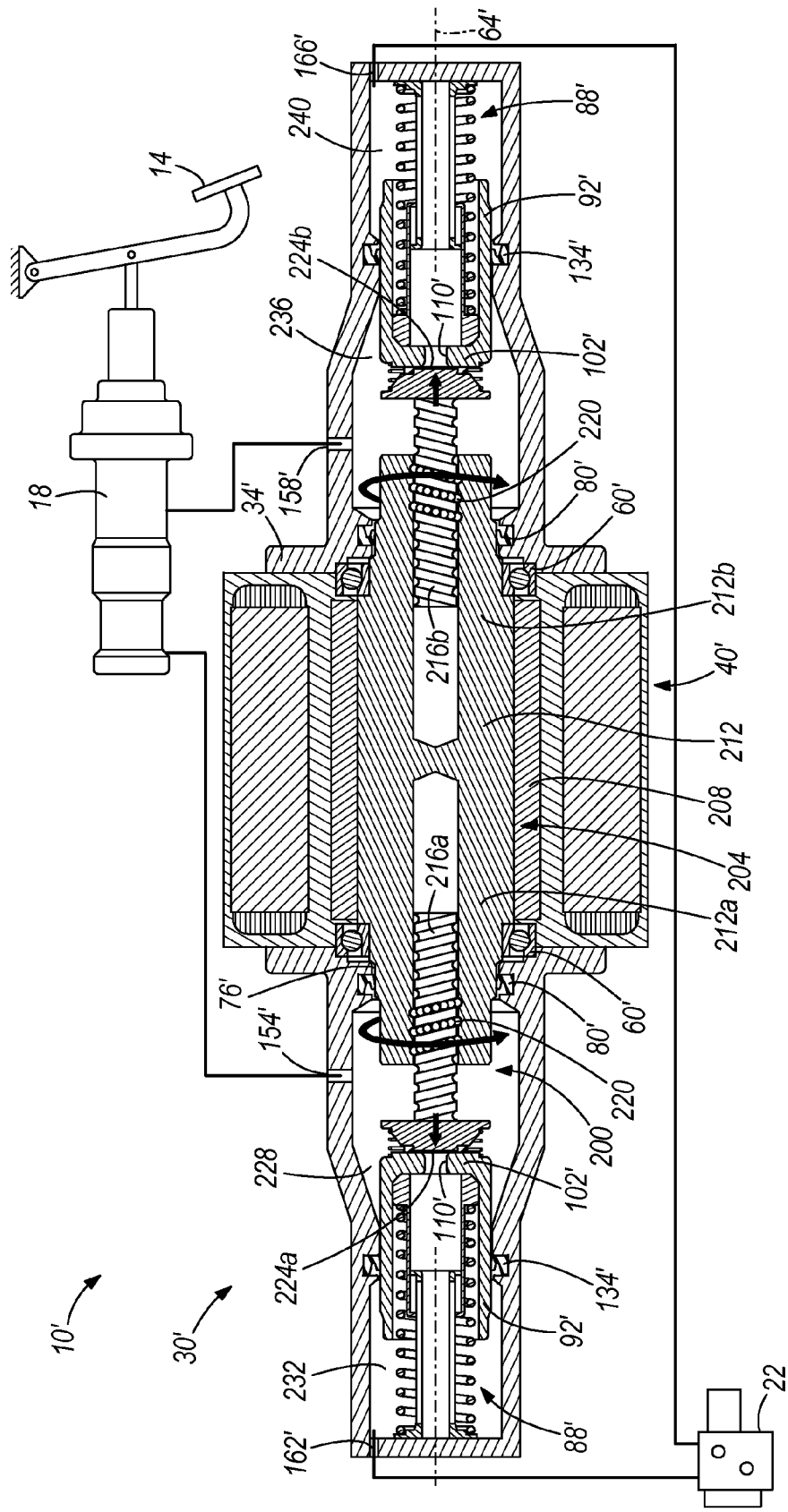
FIG. 17 is a section and partially schematic view of the brake booster of FIG. 13, shown in a non-user-actuated braking position.

FIG. 17 illustrates a non-user-actuated braking position of the booster 30', such as operation of adaptive cruise control. In this state, the user does not depress the brake pedal 14 at all, but instead, braking is initiated wholly by a vehicle system. The controller signals the motor 40' to apply torque, causing the screws 216a, 216b to engage and move the pistons 92' as desired based on the needs of the vehicle system.

Figure 18:
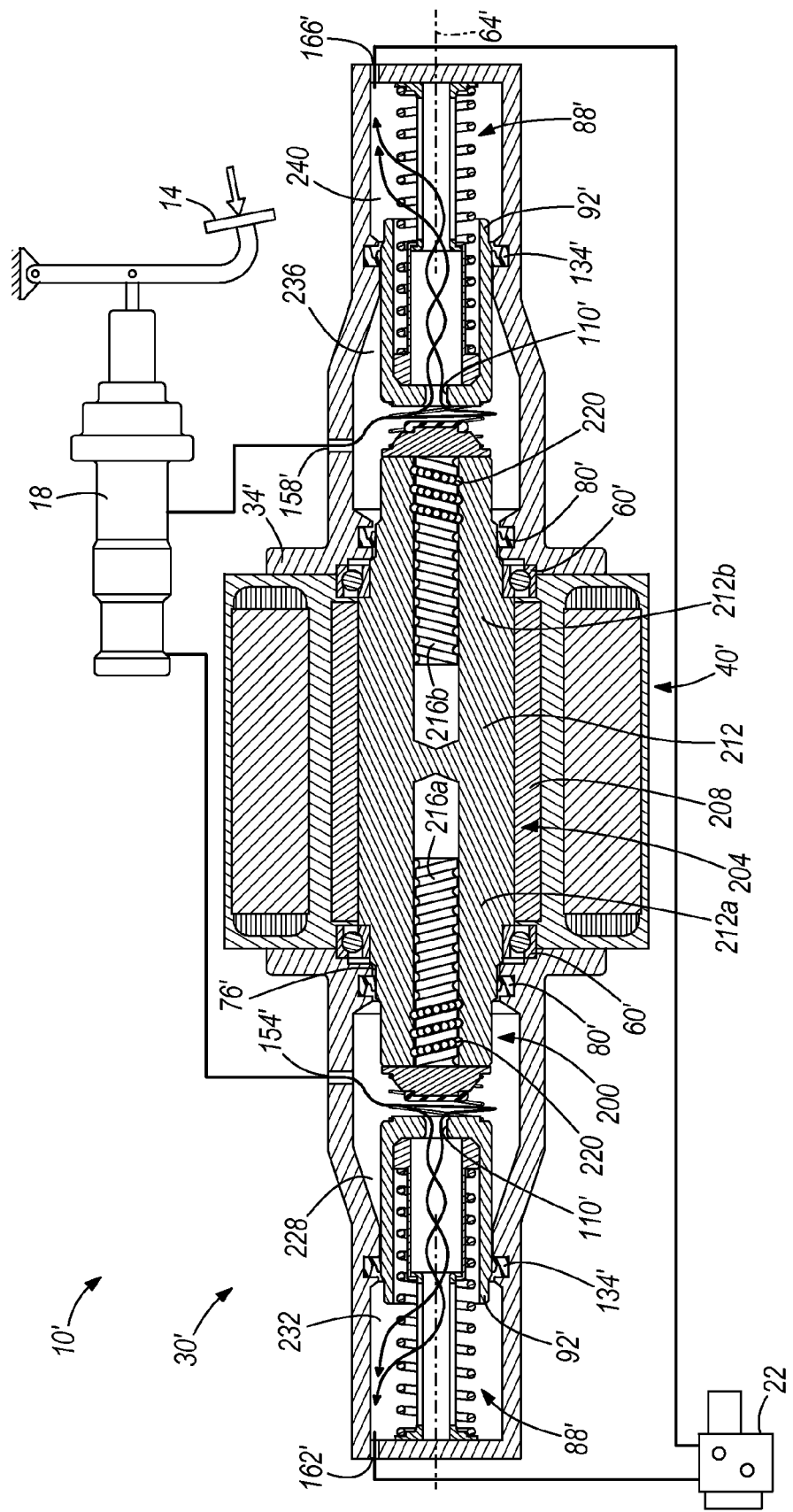
FIG. 18 is a section and partially schematic view of the brake booster of FIG. 13, shown in a user-actuated braking position when the vehicle has experienced an electrical failure or booster motor failure.

FIG. 18 illustrates a user-actuated braking position of the booster 30' when the vehicle has experienced an electrical failure or booster motor failure that renders the motor 40' inoperable. To ensure that the vehicle is still capable of being stopped, hydraulic fluid pressurized in the master cylinder 18 by the user's depression of the brake pedal 14 enters each of the first and third fluid chambers 228, 236 through the respective openings 154', 158', can pass directly through the openings 122' into the second and fourth fluid chambers 232, 240, can continue through the respective openings 162', 166', and to the hydraulic control unit 22. The hydraulic control unit 22 therefore still has pressurized hydraulic fluid to control wheel braking In this condition, the booster 30' does not provide resistance to manual pressure increase by the user. Furthermore, since there is no vacuum booster present, there is no resistance force to the user that is otherwise associated with the force of a diaphragm return spring of a vacuum booster (e.g., greater than 200N of resistance force).

Figure 19:
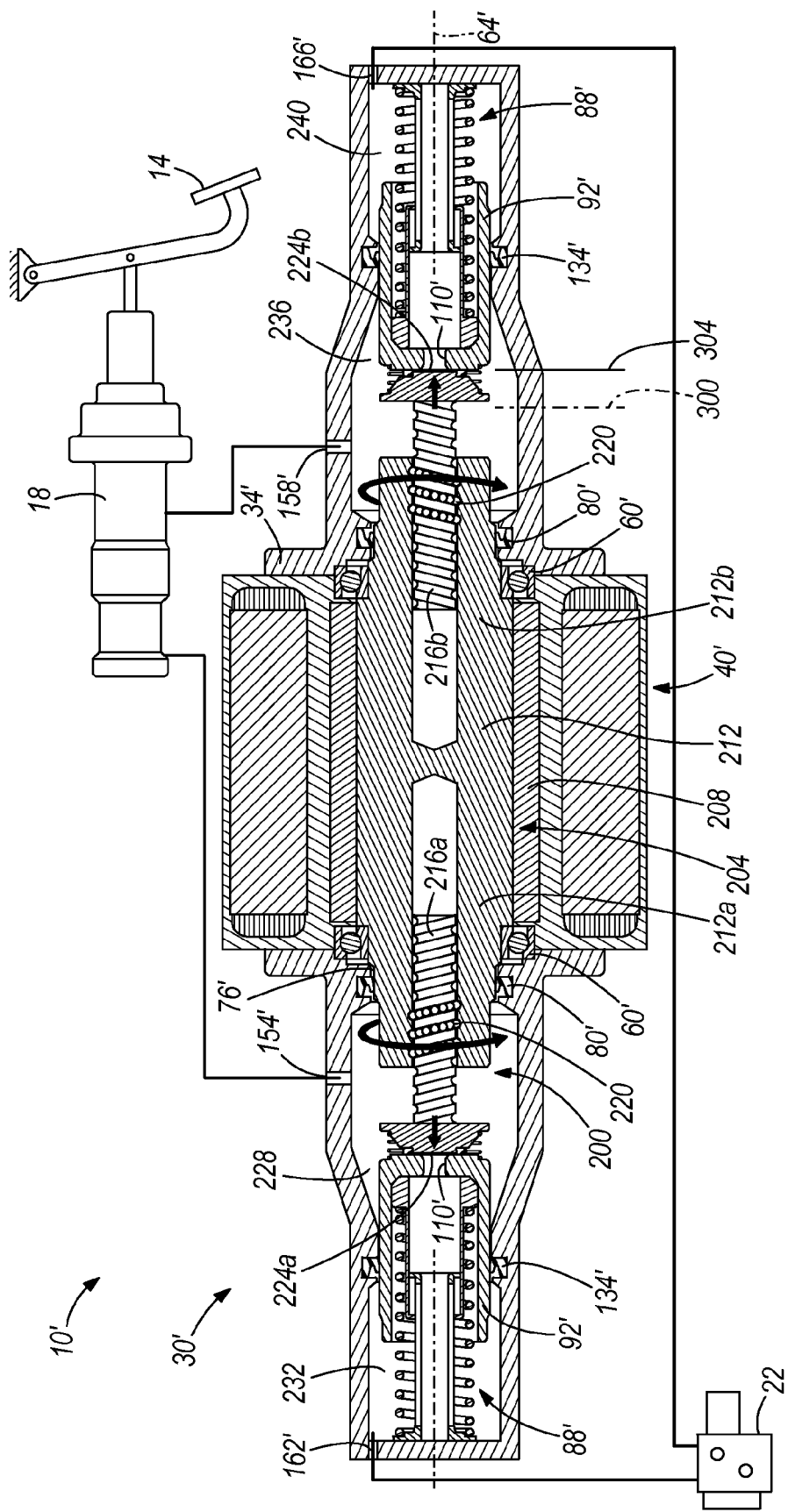
FIG. 19 is a section and partially schematic view of the brake booster of FIG. 13, showing a dead stroke adjustment capability of the brake booster.

FIG. 19 illustrates a dead stroke adjustment capability of the booster 30'. The booster 30' can be controlled to account for or adjust for dead stroke, which is what causes the softness in the feel of the brake pedal 14 due to the large travel required of the brake pedal 14 before pressure is applied to the wheel brakes 26. As shown in FIG. 19, the stand-by position can be adjusted from that shown in FIG. 14 (as indicated by dashed line 300) to an adjusted position (as indicated by the line 304) in which the screws 216a, 216b are controlled to exert more outward force on, and cause more movement of, the pistons 92'. In this adjusted stand-by position, when the user depresses the brake pedal 14, less softness or dead stroke will exist, giving the brakes a harder, or more responsive feel. This adjustment is controlled by the controller having the motor 40' apply a bit more torque to the rotor 204 to drive the screws 216a, 216b a bit further than was done in the FIG. 14 stand-by position. The amount of adjustment can be varied to provide the desired brake feel. This feature can be useful, for example, in conjunction with high-retraction/low-drag calipers.

Various features and advantages of the invention are set forth in the following claims.

What is claimed is:

1. A brake booster for use in a hydraulic braking system having a brake pedal, a master cylinder, and a hydraulic control unit, the brake booster comprising:
a housing;
a screw drive arrangement positioned at least partially in the housing;
a motor coupled to the housing for actuating the screw drive arrangement; and
a piston assembly positioned in the housing, the piston assembly and the housing together at least partially defining
a first fluid chamber having an opening for providing fluid communication with the master cylinder; and
a second fluid chamber having an opening for providing fluid communication with the hydraulic control unit;
wherein the screw drive arrangement is operable to move a piston of the piston assembly for varying the volume of the second fluid chamber; and
wherein movement of the piston does not vary the volume of the first fluid chamber;
wherein the screw drive arrangement includes a rotor driven by the motor;
wherein the screw drive arrangement further includes
a screw coupled to the rotor for rotation therewith; and
a nut positioned over the screw;
wherein rotation of the screw in a first direction causes movement of the nut in a direction toward the piston assembly;
wherein the nut includes a sealing surface selectively engageable with the piston to seal an opening in the piston, thereby isolating the first fluid chamber from the second fluid chamber.

2. The brake booster of claim 1, wherein the screw drive arrangement defines a longitudinal axis, and wherein each of the first fluid chamber and the second fluid chamber is coaxial with the longitudinal axis.

3. The brake booster of claim 1, wherein the piston assembly is a first piston assembly and the piston is a first piston, and further comprising a second piston assembly positioned in the housing, the second piston assembly and the housing together at least partially defining
a third fluid chamber having an opening for providing fluid communication with the master cylinder; and
a fourth fluid chamber having an opening for providing fluid communication with the hydraulic control unit;
wherein the screw drive arrangement is operable to move a second piston of the second piston assembly for varying the volume of the fourth fluid chamber; and
wherein movement of the second piston by the screw drive arrangement does not vary the volume of the third fluid chamber.

4. The brake booster of claim 3, wherein the screw drive arrangement defines a longitudinal axis, and wherein each of the first fluid chamber, the second fluid chamber, the third fluid chamber, and the fourth fluid chamber is coaxial with the longitudinal axis.

5. The brake booster of claim 1, wherein the screw drive arrangement is a ball screw drive further including a plurality of balls positioned between the screw and the nut.

6. The brake booster of claim 1, wherein the nut has a nut outer surface dimension, wherein the piston has a piston outer surface dimension, and wherein the nut outer surface dimension substantially equals the piston outer surface dimension.

7. The brake booster of claim 6, wherein the nut has a generally cylindrical outer surface such that the nut outer surface dimension is a diameter, and wherein the piston has a generally cylindrical outer surface such that the piston outer surface dimension is a diameter.

8. The brake booster of claim 6, wherein the first fluid chamber is further defined by a first seal sealingly engaging the nut outer surface and a second seal sealingly engaging the piston outer surface so that movement of the engaged piston and nut does not vary the volume of the first fluid chamber.

9. The brake booster of claim 1, wherein the piston assembly further includes a biasing member biasing the piston toward the first fluid chamber and toward the screw drive arrangement.

10. The brake booster of claim 1, further comprising an anti-rotation member coupled between the piston and the screw drive arrangement, the anti-rotation member operable to substantially prevent rotation of the piston during engagement of the piston by the screw drive arrangement.

11. The brake booster of claim 10, wherein the anti-rotation member is a spring that further biases the piston and the screw drive arrangement apart.

12. The brake booster of claim 1, wherein the motor is controlled based on at least one of brake pedal travel, force applied to the brake pedal, and master cylinder pressure.

13. The brake booster of claim 1, wherein in the event of a failure of the motor and upon a user depressing the brake pedal, pressurized fluid in the first fluid chamber flows directly into the second fluid chamber.

14. A hydraulic braking system comprising:
a brake pedal;
a master cylinder coupled with the brake pedal;
a hydraulic control unit coupled with a plurality of wheel brakes; and
a brake booster coupled between the master cylinder and the hydraulic control unit, the brake booster including
a housing;
a screw drive arrangement positioned at least partially in the housing;
a motor coupled to the housing for actuating the screw drive arrangement; and
a piston assembly positioned in the housing, the piston assembly and the housing together at least partially defining
a first fluid chamber having an opening in fluid communication with the master cylinder; and
a second fluid chamber having an opening in fluid communication with the hydraulic control unit;
wherein the screw drive arrangement is operable to move a piston of the piston assembly for varying the volume of the second fluid chamber; and
wherein movement of the piston does not vary the volume of the first fluid chamber;
wherein the screw drive arrangement includes a rotor driven by the motor;
wherein the screw drive arrangement further includes
a screw coupled to the rotor for rotation therewith; and
a nut positioned over the screw;
wherein rotation of the screw in a first direction causes movement of the nut in a direction toward the piston assembly;
wherein the nut includes a sealing surface selectively engageable with the piston to seal an opening in the piston, thereby isolating the first fluid chamber from the second fluid chamber.

15. The hydraulic braking system of claim 14,
wherein the nut has a nut outer surface dimension, the piston has a piston outer surface dimension, and the nut outer surface dimension substantially equals the piston outer surface dimension; and
wherein the first fluid chamber is further defined by a first seal sealingly engaging the nut outer surface and a second seal sealingly engaging the piston outer surface so that movement of the engaged piston and nut does not vary the volume of the first fluid chamber.

16. A brake booster for use in a hydraulic braking system having a brake pedal, a master cylinder, and a hydraulic control unit, the brake booster comprising:
a housing;
a screw drive arrangement positioned at least partially in the housing;
a motor coupled to the housing for actuating the screw drive arrangement; and
a piston assembly positioned in the housing, the piston assembly and the housing together at least partially defining
a first fluid chamber having an opening for providing fluid communication with the master cylinder; and
a second fluid chamber having an opening for providing fluid communication with the hydraulic control unit;
wherein the screw drive arrangement is operable to move a piston of the piston assembly for varying the volume of the second fluid chamber; and
wherein movement of the piston does not vary the volume of the first fluid chamber;
wherein the screw drive arrangement includes a rotor driven by the motor;
wherein the screw drive arrangement further includes
a screw coupled to the rotor for rotation therewith; and
a nut positioned over the screw;
wherein rotation of the screw in a first direction causes movement of the nut in a direction toward the piston assembly;
wherein the nut has a nut outer surface dimension, wherein the piston has a piston outer surface dimension, and wherein the nut outer surface dimension substantially equals the piston outer surface dimension; and
wherein the first fluid chamber is further defined by a first seal sealingly engaging the nut outer surface and a second seal sealingly engaging the piston outer surface so that movement of the engaged piston and nut does not vary the volume of the first fluid chamber.

17. The brake booster of claim 16, wherein the screw drive arrangement defines a longitudinal axis, and wherein each of the first fluid chamber and the second fluid chamber is coaxial with the longitudinal axis.

18. The brake booster of claim 16, wherein the piston assembly is a first piston assembly and the piston is a first piston, and further comprising a second piston assembly positioned in the housing, the second piston assembly and the housing together at least partially defining
a third fluid chamber having an opening for providing fluid communication with the master cylinder; and
a fourth fluid chamber having an opening for providing fluid communication with the hydraulic control unit;
wherein the screw drive arrangement is operable to move a second piston of the second piston assembly for varying the volume of the fourth fluid chamber; and
wherein movement of the second piston by the screw drive arrangement does not vary the volume of the third fluid chamber.

19. The brake booster of claim 18, wherein the screw drive arrangement defines a longitudinal axis, and wherein each of the first fluid chamber, the second fluid chamber, the third fluid chamber, and the fourth fluid chamber is coaxial with the longitudinal axis.

20. The brake booster of claim 16, wherein the screw drive arrangement is a ball screw drive further including a plurality of balls positioned between the screw and the nut.

21. The brake booster of claim 16, wherein the nut has a generally cylindrical outer surface such that the nut outer surface dimension is a diameter, and wherein the piston has a generally cylindrical outer surface such that the piston outer surface dimension is a diameter.

22. The brake booster of claim 16, wherein the piston assembly further includes a biasing member biasing the piston toward the first fluid chamber and toward the screw drive arrangement.

23. The brake booster of claim 16, further comprising an anti-rotation member coupled between the piston and the screw drive arrangement, the anti-rotation member operable to substantially prevent rotation of the piston during engagement of the piston by the screw drive arrangement.

24. The brake booster of claim 23, wherein the anti-rotation member is a spring that further biases the piston and the screw drive arrangement apart.

25. The brake booster of claim 16, wherein the motor is controlled based on at least one of brake pedal travel, force applied to the brake pedal, and master cylinder pressure.

26. The brake booster of claim 16, wherein in the event of a failure of the motor and upon a user depressing the brake pedal, pressurized fluid in the first fluid chamber flows directly into the second fluid chamber.

27. A hydraulic braking system comprising:
a brake pedal;
a master cylinder coupled with the brake pedal;
a hydraulic control unit coupled with a plurality of wheel brakes; and
a brake booster coupled between the master cylinder and the hydraulic control unit, the brake booster including
  a housing;
  a screw drive arrangement positioned at least partially in the housing;
  a motor coupled to the housing for actuating the screw drive arrangement; and
  a piston assembly positioned in the housing, the piston assembly and the housing together at least partially defining
    a first fluid chamber having an opening in fluid communication with the master cylinder; and
    a second fluid chamber having an opening in fluid communication with the hydraulic control unit;
wherein the screw drive arrangement is operable to move a piston of the piston assembly for varying the volume of the second fluid chamber;
wherein movement of the piston does not vary the volume of the first fluid chamber;
wherein the nut has a nut outer surface dimension, the piston has a piston outer surface dimension, and the nut outer surface dimension substantially equals the piston outer surface dimension; and
wherein the first fluid chamber is further defined by a first seal sealingly engaging the nut outer surface and a second seal sealingly engaging the piston outer surface so that movement of the engaged piston and nut does not vary the volume of the first fluid chamber.

* * * * *